United States Patent
Engelking

(10) Patent No.: US 9,544,307 B2
(45) Date of Patent: *Jan. 10, 2017

(54) PROVIDING A SECURITY MECHANISM ON A MOBILE DEVICE

(71) Applicant: salesforce.com, inc., San Francisco, CA (US)

(72) Inventor: Eric William Engelking, Santa Monica, CA (US)

(73) Assignee: salesforce.com, inc., San Francisco, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/527,465

(22) Filed: Oct. 29, 2014

(65) Prior Publication Data

US 2016/0127358 A1   May 5, 2016

(51) Int. Cl.
*G06F 21/00* (2013.01)
*H04L 29/06* (2006.01)
*H04L 9/32* (2006.01)

(52) U.S. Cl.
CPC ......... *H04L 63/0861* (2013.01); *H04L 9/3247* (2013.01); *H04L 63/083* (2013.01); *H04L 63/0823* (2013.01)

(58) Field of Classification Search
CPC .. H04L 63/0861; H04L 9/3247; H04L 63/083; H04L 63/0823
USPC .............. 713/156; 726/1, 4, 17, 25, 28
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

FOREIGN PATENT DOCUMENTS

WO   WO 2014/144796   9/2014

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — David García Cervetti
(74) *Attorney, Agent, or Firm* — Weaver Austin Villeneuve & Sampson LLP

(57) ABSTRACT

Disclosed are methods, apparatus, systems, and computer program products for providing a security mechanism on a mobile device before performing an action on a database record in an on-demand database service. The action to be performed can be identified for requesting third-party information. When the third-party information is provided by a user who does not have authorization to access data locally or remotely from the mobile device, the action is performed on the database record but the security mechanism can be activated for display on the mobile device. When the security mechanism is traversed, the mobile device can be unlocked and a user can access the database record in the on-demand database service.

18 Claims, 19 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,269,369 B1 * | 7/2001 | Robertson ............ G06Q 10/02 |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 * | 4/2010 | Beaven ............ G06Q 10/0633 705/26.1 |
| 7,730,478 B2 * | 6/2010 | Weissman ........... G06F 21/6218 717/100 |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,001,010 B2 | 8/2011 | Ho et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,069,166 B2 * | 11/2011 | Alvarado ............ G06Q 10/109 707/722 |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,364,969 B2 * | 1/2013 | King ................... G06F 21/6254 713/182 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,063,632 B2 | 6/2015 | Beechuk et al. |
| 2001/0044791 A1 | 11/2001 | Richter et al. |
| 2002/0072951 A1 | 6/2002 | Lee et al. |
| 2002/0082892 A1 * | 6/2002 | Raffel .................. G06Q 10/063 705/7.26 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |

(56) References Cited

U.S. PATENT DOCUMENTS

| | | |
|---|---|---|
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0249911 A1* | 12/2004 | Alkhatib ............ G06Q 10/109 709/223 |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0197846 A1* | 9/2005 | Pezaris ............. G06Q 10/0637 705/319 |
| 2007/0239507 A1* | 10/2007 | Madhogarhia ......... G06Q 10/10 705/80 |
| 2008/0052371 A1 | 2/2008 | Partovi et al. |
| 2008/0249972 A1 | 10/2008 | Dillon |
| 2009/0063415 A1 | 3/2009 | Chatfield et al. |
| 2009/0069912 A1 | 3/2009 | Stefik |
| 2009/0100342 A1 | 4/2009 | Jakobson |
| 2009/0144741 A1 | 6/2009 | Tsuda et al. |
| 2009/0177744 A1 | 7/2009 | Marlow et al. |
| 2009/0254838 A1 | 10/2009 | Rao et al. |
| 2009/0282121 A1* | 11/2009 | Robertson .......... H04L 63/0227 709/206 |
| 2009/0292786 A1* | 11/2009 | McCabe ............. G06F 21/64 709/206 |
| 2010/0076937 A1* | 3/2010 | Abdelnur ........... G06F 17/3089 707/679 |
| 2010/0306824 A1* | 12/2010 | Gurney .............. G06F 21/6245 726/4 |
| 2011/0178866 A1 | 7/2011 | Levine et al. |
| 2011/0202668 A1* | 8/2011 | Tarrago ............. H04L 63/0823 709/228 |
| 2011/0214086 A1 | 9/2011 | Narayanan et al. |
| 2011/0218958 A1 | 9/2011 | Warshavsky et al. |
| 2011/0247051 A1 | 10/2011 | Bulumulla et al. |
| 2011/0270748 A1* | 11/2011 | Graham, III ......... G06Q 20/102 705/40 |
| 2011/0276875 A1* | 11/2011 | McCabe ............. G06Q 10/10 715/255 |
| 2011/0314371 A1* | 12/2011 | Peterson ............ G06F 21/645 715/234 |
| 2012/0027256 A1* | 2/2012 | Kiyohara .......... G06F 17/30029 382/103 |
| 2012/0042218 A1 | 2/2012 | Cinarkaya et al. |
| 2012/0078727 A1* | 3/2012 | Lee .................. G06Q 30/02 705/14.66 |
| 2012/0078953 A1 | 3/2012 | Araya |
| 2012/0084151 A1* | 4/2012 | Kozak ............... G06Q 30/02 705/14.58 |
| 2012/0084348 A1* | 4/2012 | Lee .................. G06Q 30/02 709/203 |
| 2012/0084349 A1* | 4/2012 | Lee .................. G06Q 30/02 709/203 |
| 2012/0086544 A1 | 4/2012 | Kemp |
| 2012/0096041 A1 | 4/2012 | Rao et al. |
| 2012/0102114 A1 | 4/2012 | Dunn et al. |
| 2012/0102402 A1 | 4/2012 | Kwong |
| 2012/0130973 A1 | 5/2012 | Tamm et al. |
| 2012/0136905 A1 | 5/2012 | Pullara |
| 2012/0210377 A1 | 8/2012 | Wong et al. |
| 2012/0223951 A1 | 9/2012 | Dunn et al. |
| 2012/0226803 A1 | 9/2012 | Bharadwaj |
| 2012/0233137 A1 | 9/2012 | Jakobson et al. |
| 2012/0278725 A1 | 11/2012 | Gordon et al. |
| 2012/0290407 A1 | 11/2012 | Hubbard et al. |
| 2012/0331053 A1 | 12/2012 | Dunn |
| 2013/0007148 A1 | 1/2013 | Olsen |
| 2013/0018960 A1* | 1/2013 | Knysz ............... H04L 65/403 709/204 |
| 2013/0019289 A1* | 1/2013 | Gonser ............... G06F 21/64 726/6 |
| 2013/0024454 A1 | 1/2013 | Dunn |
| 2013/0024788 A1 | 1/2013 | Olsen et al. |
| 2013/0031487 A1* | 1/2013 | Olsen ................ G06Q 50/01 715/751 |
| 2013/0054517 A1 | 2/2013 | Beechuk et al. |
| 2013/0212497 A1 | 8/2013 | Zelenko et al. |
| 2013/0218845 A1* | 8/2013 | Kleppner .......... G06F 17/30165 707/687 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0254397 A1* | 9/2013 | Lai ................... H04L 65/40 709/225 |
| 2013/0318589 A1* | 11/2013 | Ford ................. H04L 63/08 726/7 |
| 2013/0326597 A1* | 12/2013 | Matsushita ...... H04N 21/25875 726/5 |
| 2014/0041038 A1 | 2/2014 | Lessin et al. |
| 2014/0047560 A1* | 2/2014 | Meyer ............... G06F 21/62 726/28 |
| 2014/0122592 A1* | 5/2014 | Houston ............ H04L 67/1095 709/204 |
| 2014/0122622 A1* | 5/2014 | Castera ............. H04L 51/32 709/206 |
| 2014/0250491 A1* | 9/2014 | Fleischman ......... H04L 63/20 726/1 |
| 2014/0280134 A1 | 9/2014 | Horen et al. |
| 2014/0280329 A1 | 9/2014 | Beechuk et al. |
| 2014/0280577 A1 | 9/2014 | Beechuk et al. |
| 2014/0282100 A1 | 9/2014 | Beechuk et al. |
| 2014/0282101 A1 | 9/2014 | Beechuk et al. |
| 2014/0299662 A1* | 10/2014 | Harrison .......... G06F 17/30879 235/380 |
| 2014/0304618 A1* | 10/2014 | Carriero ............ H04L 12/1818 715/753 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0135300 A1* | 5/2015 | Ford ................ H04L 67/1097 726/11 |
| 2015/0142596 A1 | 5/2015 | Jakobson et al. |
| 2015/0143248 A1* | 5/2015 | Beechuk ............ H04L 67/10 715/739 |
| 2015/0163206 A1* | 6/2015 | McCarthy .......... G06F 21/6227 713/171 |
| 2015/0172321 A1* | 6/2015 | Kirti ................. H04L 63/1416 726/1 |
| 2015/0172563 A1 | 6/2015 | Jakobson et al. |

OTHER PUBLICATIONS

U.S. Office Action dated Nov. 21, 2013 issued in U.S. Appl. No. 13/943,657.

U.S. Final Office Action dated Jun. 26, 2014 issued in U.S. Appl. No. 13/943,657.

U.S. Notice of Allowance dated Dec. 16, 2014 issued in U.S. Appl. No. 13/943,657.

U.S. Notice of Allowance dated Mar. 27, 2015 issued in U.S. Appl. No. 13/943,657.

U.S. Office Action dated Mar. 27, 2015 issued in U.S. Appl. No. 13/943,629.

U.S. Office Action dated Feb. 1, 2016 issued in U.S. Appl. No. 14/137,202.

U.S. Office Action dated Feb. 16, 2016 issued in U.S. Appl. No. 13/943,636.

U.S. Notice of Allowance dated Jun. 30, 2016 issued in U.S. Appl. No. 13/943,636.

U.S. Office Action dated Aug. 7, 2015 issued in U.S. Appl. No. 13/943,640.

(56) References Cited

OTHER PUBLICATIONS

U.S. Final Office Action dated Mar. 21, 2016 issued in U.S. Appl. No. 13/943,640.
PCT International Search Report and Written Opinion dated Aug. 28, 2014 issued in PCT/US2014/029355.
PCT International Preliminary Report on Patentability and Written Opinion dated Sep. 24, 2015 issued in PCT/US2014/029355.
European Extended Search Report dated Jul. 13, 2016 issued in EP 14 76 5571.
"Create, change, or delete an OLE object," (2014) [retrieved on Nov. 12, 2014 at http://office.microsoft.com/en-us/powerpoint-help/create-change-or-delete-an-ole-object-HA010199192.aspx], *Microsoft*, 13 pages.
Dale Technologies, LLC., (Copyright 2011) "vMail™ for Salesforce® Users Guide", pp. 9-11 and 17, vMailSalesforceUsersGuide_v2.1 [1].pdf, 29 pp.
Fulton, Scott M. (Aug. 31, 2011) "Live From Dreamforce '11—Benioff Says You Can Now Store Salesforce Data Locally", [Retrieved from the Internet on Nov. 17, 2013 at http://readwrite.com/2011/08/31/ livefrom-dreamforce-11---sale.pdf, 22 pp.

\* cited by examiner

FIGURE 5

PROVIDING A SECURITY MECHANISM ON A MOBILE DEVICE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to data security and, more specifically, to techniques for activating a security mechanism on a mobile device prior to performing an action on a database record in a database system associated with an on-demand database service.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, devices, and methods for performing an action on a database record. These drawings in no way limit any changes in form and detail that may be made by one skilled in the art without departing from the spirit and scope of the disclosed implementations.

FIG. 5 shows an example of a database record with a user interface including a feed with a feed item presenting a newly created contact record, according to some implementations.

DETAILED DESCRIPTION

Figure 1A:
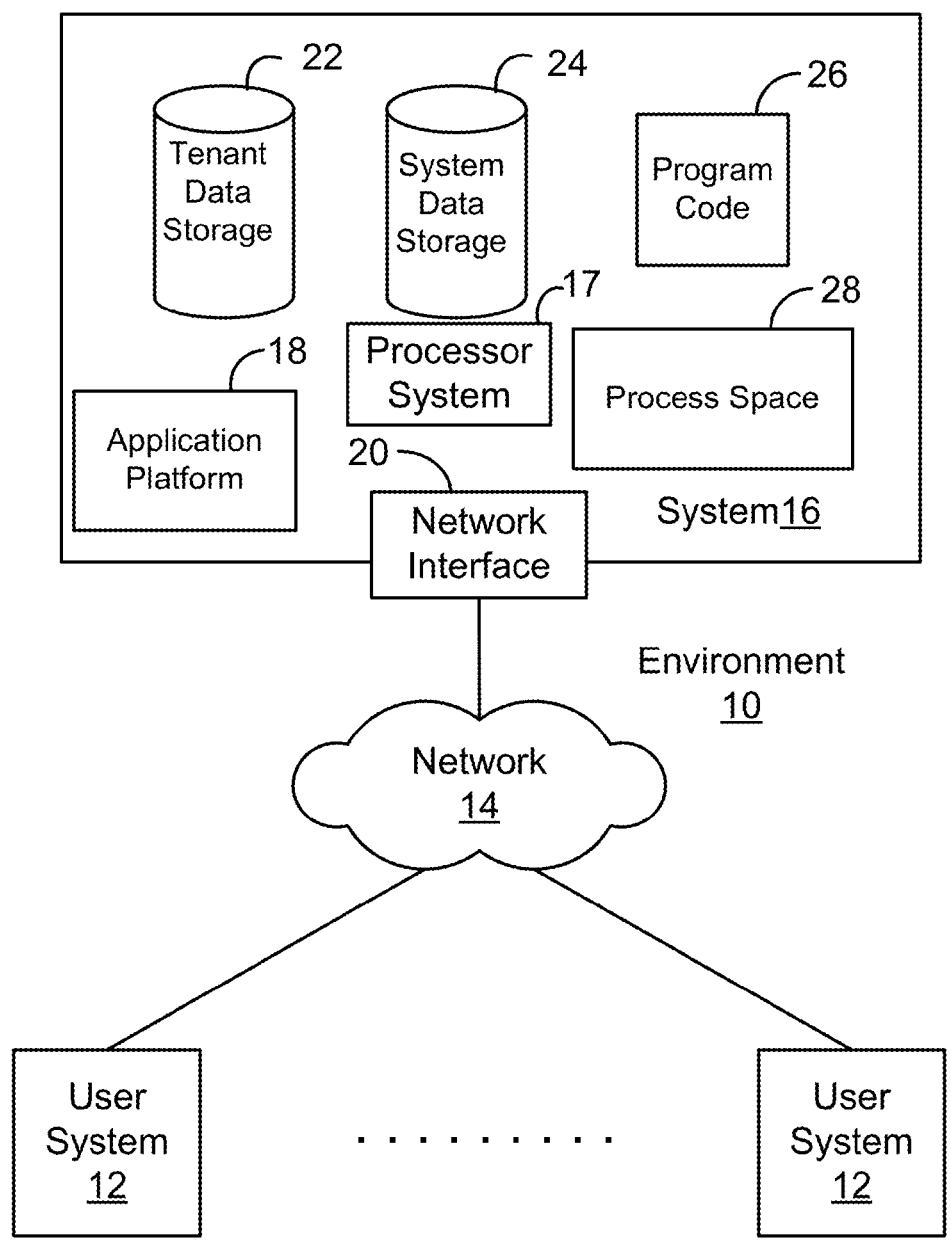
FIG. 1A shows a block diagram of an example of an environment 10 in which an on-demand database service can be used in accordance with some implementations.

Examples of systems, apparatus, devices, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, devices, and computer-readable storage media for providing a security mechanism on a mobile device. More and more computing devices are moving from the desktop environment to mobile device environments. Mobile devices are increasingly relied upon for accessing information and getting work done. Mobile devices may store large amounts of data and may be capable of accessing greater amounts of data across a network. However, because such devices are more mobile and have a small form factor, mobile devices may be vulnerable to theft or unauthorized access. Accordingly, providing adequate data security against theft or unauthorized access is increasingly becoming more important.

Users may perform actions to create or update database records in a database system associated with an on-demand database service. The on-demand database service may be part of a platform, and each of the actions may perform certain functions within the platform. An example of a platform with suitable capabilities can include Salesforce1™. The platform can integrate various services and APIs, where each action may be performed using the platform's API and the action's associated method call without having to be redefined for each user system (e.g., mobile phone, laptop, tablet, etc.).

In some implementations, the action to be performed can be identified for receiving third-party information, where the third-party information can include information provided from a user not associated with the mobile device. The action is performed on the database record using the third-party information. In such instances, the mobile device may be given to a user not authorized to access data on the mobile device or data stored in a database system of an on-demand database service, where the database system is associated with an authorized user. Access to such local or network data may be disabled by activating a security mechanism. The security mechanism restricts access to data on the mobile device.

By way of an example, a field agent may be deployed to a customer site. The field agent may desire to update the status of a service request, but completion of the service request may require a signature from the customer. The field agent can hand her mobile phone to the customer, and the customer can enter her signature. The status of the service request can be updated with the signature. If the customer wishes to advance to another screen by exiting the signature interface, a security mechanism on the mobile phone can be activated. The security mechanism can require an alphanumeric password, a graphical password, a motion-based password, or a biometric input. That way, local and network data on the mobile phone may be secured against unauthorized access during the process of collecting the customer's signature.

In some implementations, an on-demand database service can include an enterprise social networking system. One example of an enterprise social networking system is Chatter®, provided by salesforce.com, inc. of San Francisco, Calif. Online social networks are increasingly becoming a common way to facilitate communication among people and groups of people, any of whom can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes.

In some online social networks, users can access one or more information feeds, which include information updates presented as items or entries in the feed. Such a feed item can include a single information update or a collection of individual information updates. A feed item can include various types of data including character-based data, audio data, image data and/or video data. An information feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed, also referred to herein as the user's "wall," which is one example of an information feed displayed on the user's profile page.

In some implementations, an information feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to an information feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

A publisher may be displayed in a GUI of a display device and configured to publish information to a feed. Typically, a publisher may be capable of posting messages and attaching files to the feed. The feed may be associated with an entity such as a user, group, organization, or record. The publisher may provide a user with an operable interface for receiving data entry and performing actions on a record. Thus, the publisher also may be capable of creating new records, updating existing records, or otherwise interacting with records associated with a parent record. For example, a publisher can include one or more publisher actions configured to create, update, or otherwise interact with a record. The publisher may include one or more data fields for entering information to perform any of the aforementioned actions on the record. In some implementations, the record can be a customer relationship management (CRM) object, such as a lead, a case, an account, an opportunity, a task, a contact, a campaign, a contract, an event, a custom object, and a Visualforce page. For example, a new contact record can be created from the publisher and published to a feed for an account record, where the contact record is a child record and account record is a parent record. In some implementations, the publisher can include one or more publisher actions configured to interact with an application, such as an application hosted on a third-party platform.

In some instances, a feed item is created upon performing an interaction with the record, and the feed item may include one or more selectable links. The one or more selectable links may provide a reference to the record. In some implementations, selection of one of the selectable links may cause the publisher to be operable to receive additional information and/or perform additional operations on the record. This can be useful in efficiently advancing CRM as well as non-CRM lifecycles through the publisher and feed.

The feed item may be presented for inclusion in a feed, such as a feed of a parent record of the child record being acted upon. The feed item may be characterized as a child of the parent entity in a hierarchical data model. Applying some of the disclosed techniques, the feed item can be propagated and cross-referenced for display not only in the feed of the parent entity, but also in other related feeds. Identification of such related feeds can occur by, for example, a user defining values in a payload or a system administrator hard-coding the values. In addition or in the alternative, cross-referencing rules can be embodied in code. Potential entities for cross-referencing may be provided in a database table indicating record relationship information with respect to the parent entity. Once a feed of another entity other than the parent entity is identified, a database can be accessed to indicate the entity as being cross-referenced with the feed item. As used herein, this process of identification and indication can be referred to as "cross-referencing." In some instances, any interactions performed on a given feed item such as commenting or liking the item are also presented on every other related feed including a feed item which is cross-referenced so that a single conversation thread is preserved and replicated across feeds. In some implementations, the feed item parented by the parent entity can be propagated and cross-referenced for access by followers of a cross-referenced entity.

Some of the publisher actions can be custom actions configured to interact with a record. The custom action may be defined in accordance with custom action instructions declaratively or programmatically. The custom action instructions may define the record and the interaction to be performed with the record. The custom action instructions may also define attributes of the custom action, including data fields associated with the record, validation rules associated with the one or more data fields, the page layout of the custom action in the publisher, and the action layout of the one or more data fields in the publisher. In some instances, the custom action instructions may be defined using a customization tool, such as Visualforce. This allows a user or organization to make customized user interfaces to meet their business needs.

Not only can the publisher interact with records, the publisher may also be configured to interact with applications. Such applications may be hosted natively in the on-demand service environment or hosted on a third-party platform. Custom actions may be defined to interact with the application via an API. Regardless of whether the application is hosted natively or on a third-party platform, the API can enable integration of the application into the on-demand service environment. Interactions with the application can be updated to an information feed. Such updates may occur without refreshing the user interface.

As more and more users and organizations move toward more collaborative sharing models to communicate and conduct business, there is a desire to better expose, enhance, and utilize information. Conventionally, accessing information and interacting with information in an online social network can involve navigating and switching among several different applications and interfaces. This can be cumbersome, time-consuming, and unproductive.

As noted above, some of the implementations described herein are directed at mechanisms to provide a unified user interface that enables a user to interact with a data object or application in an online social network. Such interactions can include, for example, a request to create the data object, a request to delete the data object, a request to update the data object, a request to convert the data object, a request to download data from the data object, a request to upload data to the data object, a request to attach a file to the data object, a request to view information associated with the data object, and a request to otherwise perform an operation having a reference to the data object. A unified user interface may include a feed and a publisher with a custom action, where the custom action is configured to perform one of the aforementioned interactions with the data object or application. Such interactions may occur via an API and published to an information feed in the form of a feed item. The feed item may be cross-referenced in other related feeds to provide a single conversation thread, and the feed item may have actionable selections to perform further operations on the data object. As such, the publisher and the feed item become the main interface to interact with and view relevant information without the need to switch among different applications and interfaces.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared.

In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
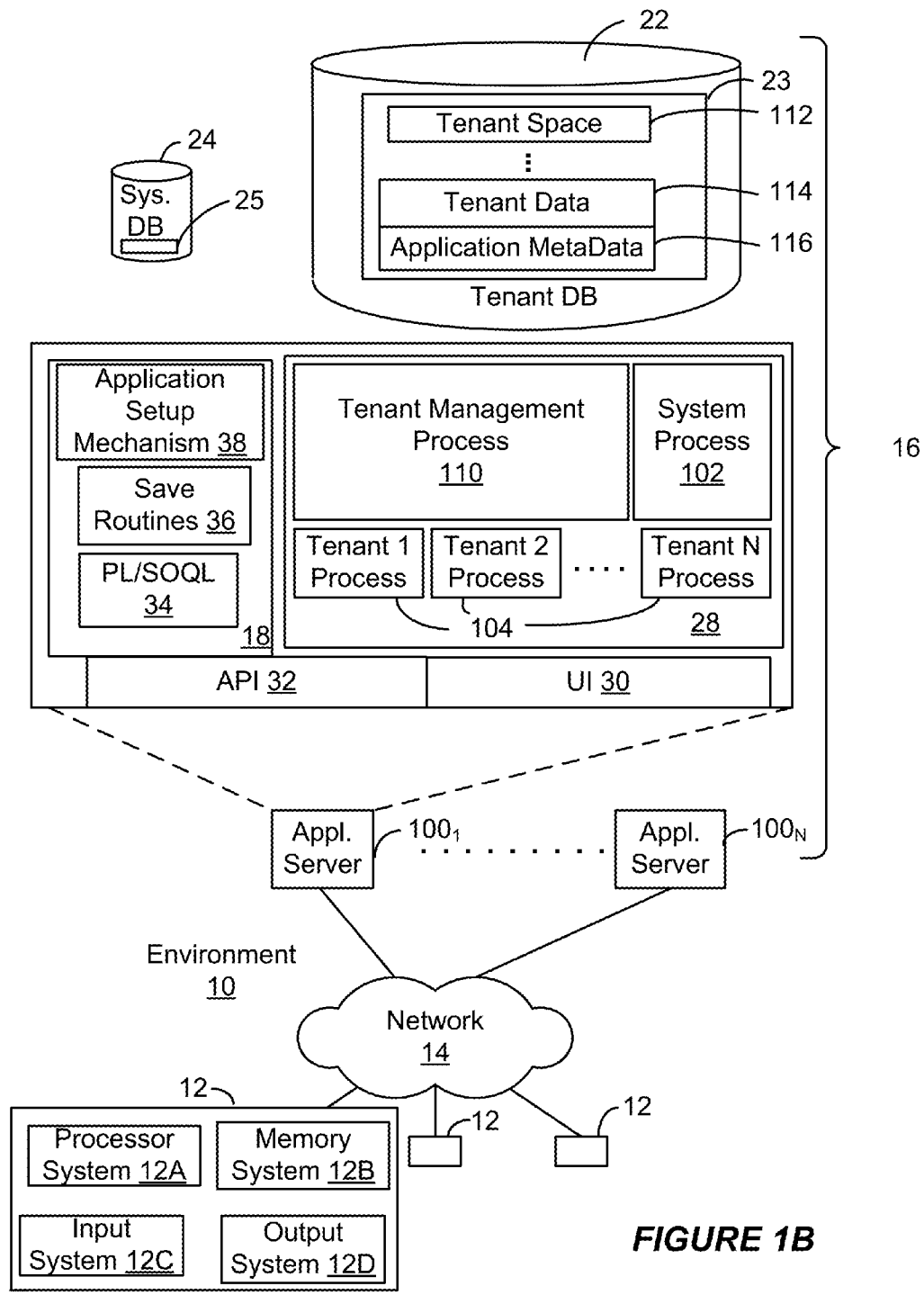
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 100₁-100ₙ, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 100₁ might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
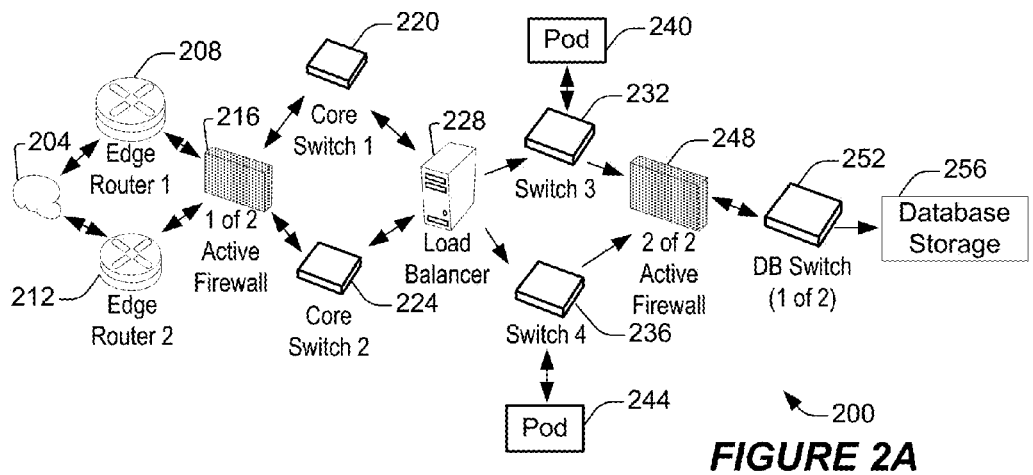
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
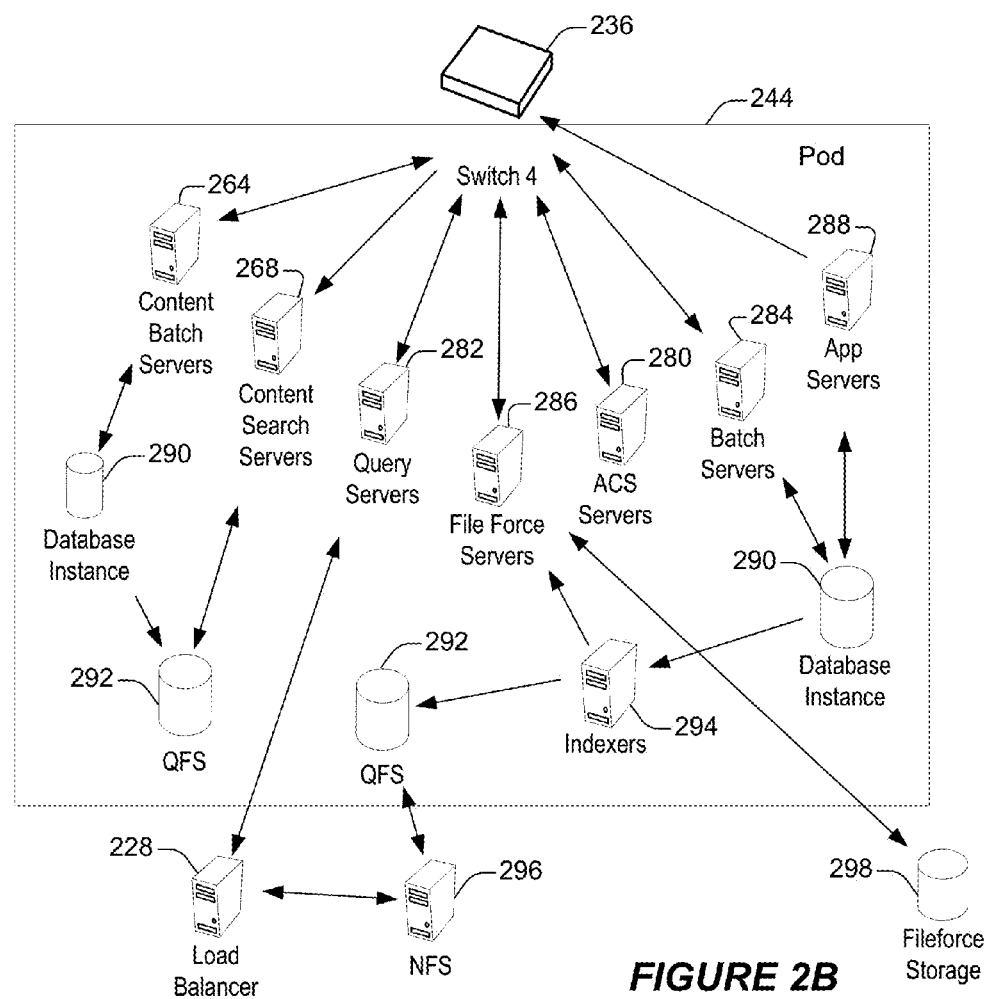
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 3-35 In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

II. Creating or Updating Records Via a Publisher and a Feed

Figure 3:
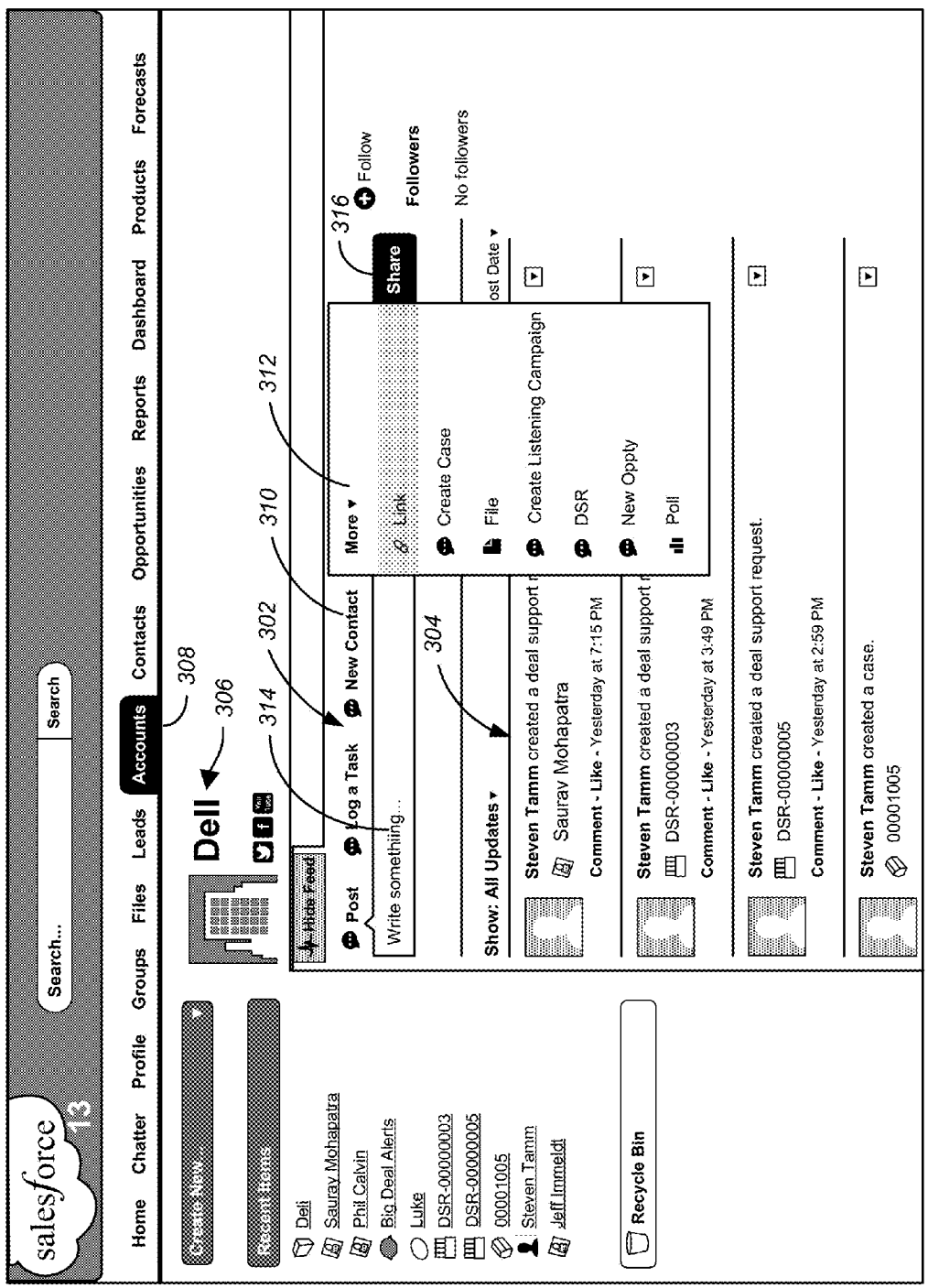
FIG. 3 shows an example of a database record with a user interface including a publisher and a feed, according to some implementations.

FIG. 3 shows an example of a parent record with a user interface including a publisher 302 and a feed 304, according to some implementations. In FIG. 3, an accounts page 306 for Dell is in the form of a graphical user interface (GUI) as displayed on a display device. A user may navigate to the accounts page 306 by selecting a tab 308 from among a plurality of tabs in the user interface. A request to perform an action on a database record may be generated in response to a user selecting a button, link, tab, or menu selection in the publisher 302. In some implementations, the database record may be related to the parent record, where the parent record is the account record for the accounts page 306. The publisher may include one or more publisher actions 310 to allow a user to make a request to perform an action on the database record to associate with the parent record. Examples of such publisher actions 310 as displayed in the publisher 302 include "Post", "Log a Task", and "New Contact". As illustrated in the example in FIG. 3, selecting "More" initiates a drop-down menu 312 to allow a user to select from more publisher actions 310 to perform an action on the database record to associate with the parent record. Such additional publisher actions 310 include "Link", "Create Case", "File", "Create Listening Campaign", "DSR", "New Oppty", and "Poll". In addition, the publisher 302 in the accounts page 306 includes a text box 314 for entry of a message. The publisher 302 also includes a share button 316 to transmit data from the publisher 302, including the message in the text box 312, to one or more computing devices and stored in one or more database systems. Some of the data may be presented in a feed item in the feed 304 in response to the transmission of data from the publisher 302.

Figure 4:
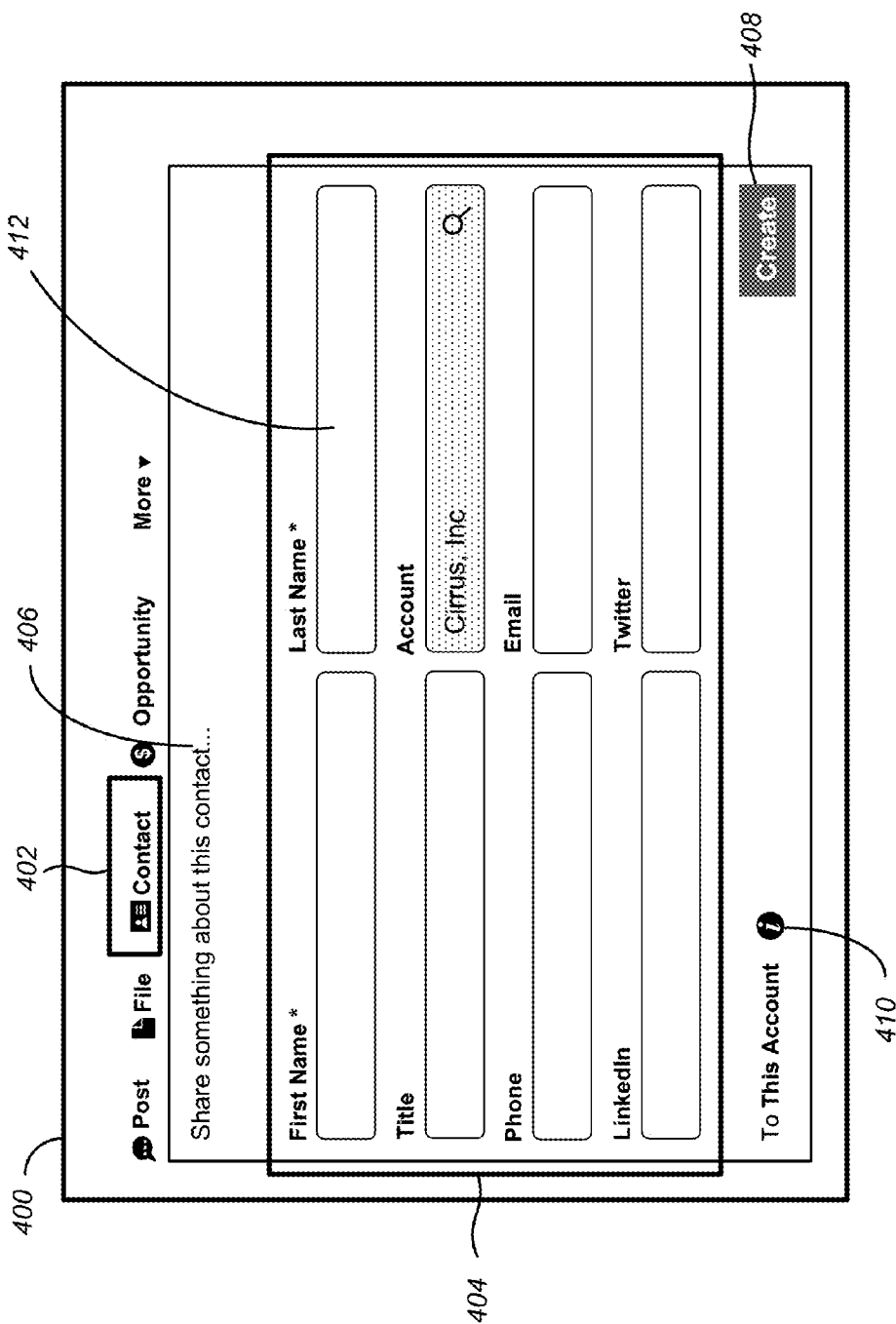
FIG. 4 shows an example of a publisher, according to some implementations.

FIG. 4 shows an example of a publisher 400, according to some implementations. The publisher 400 is an interface that allows a user to publish information that will be published into a feed. The publisher 400 may provide an interface displaying any one of a variety of designs or layouts, which can be programmed according to different preferences or requirements. For example, the interface of the publisher 400 may vary depending on whether the publisher 400 is being displayed on a web page, on a mobile device, on an automobile display, etc. Regardless of the design or layout of the interface, the publisher 400 can communicate with the same application programming interface (API) to perform the basic functionality of the publisher 400 of publishing information into a feed.

An example of an interface for the publisher 400 is shown in FIG. 4. The publisher 400 may include a plurality of publisher actions 402, a publisher space 404, a message body 406, a publishing button 408, and a share dropdown menu 410. Each of the publisher actions 402 may be in the form of GUI buttons, links, tabs, channels, or menu items. Publisher actions 402 may be enabled by the API for the publisher 700. Moreover, publisher actions 402 may be configured to perform a create or update operation for or with reference to a record. Such publisher actions 402 may be able to perform more functionality than posting a message or attaching a file to a feed. Such publisher actions 402 may be capable of creating or updating a database record to associate with a parent record.

Selection of one of the publisher actions 402 may cause the publisher space 404 to display data associated with the publisher action 402. By way of example, the publisher space 404 can include a form having a plurality of data fields 412 for creating a new contact, as illustrated in FIG. 4. The data fields 412 may permit entry of data to create or update the database record to associate with the parent record. In another example, the publisher space 404 may include content from one or more data sources, such as a web page. In still another example, the publisher space 404 may expose data from an application hosted on a third-party platform, such as Heroku™.

Data provided in the publisher space 404 may be published into a feed associated with the parent record. In FIG. 4, the plurality of data fields 412 allows a user to input information related to the creation of a new contact. Some of the data fields 412 may be greyed out with default values provided. Some of the data fields 412 may be starred to indicate that they are required fields. Some of the data fields 412 may be subject to validation rules. Information in the data fields 412 may be published along with a message provided in the message body 406. The message can include any alpha-numeric or other character-based user inputs such as words, phrases, statements, questions, emotional expressions, and/or symbols. Selection of the publishing button 408 publishes the information provided in the data fields 412 and the message body 406 to appropriate feeds. What entities the user wishes to share such information with can be provided by selection of entities from the share dropdown menu 410.

Figure 5:
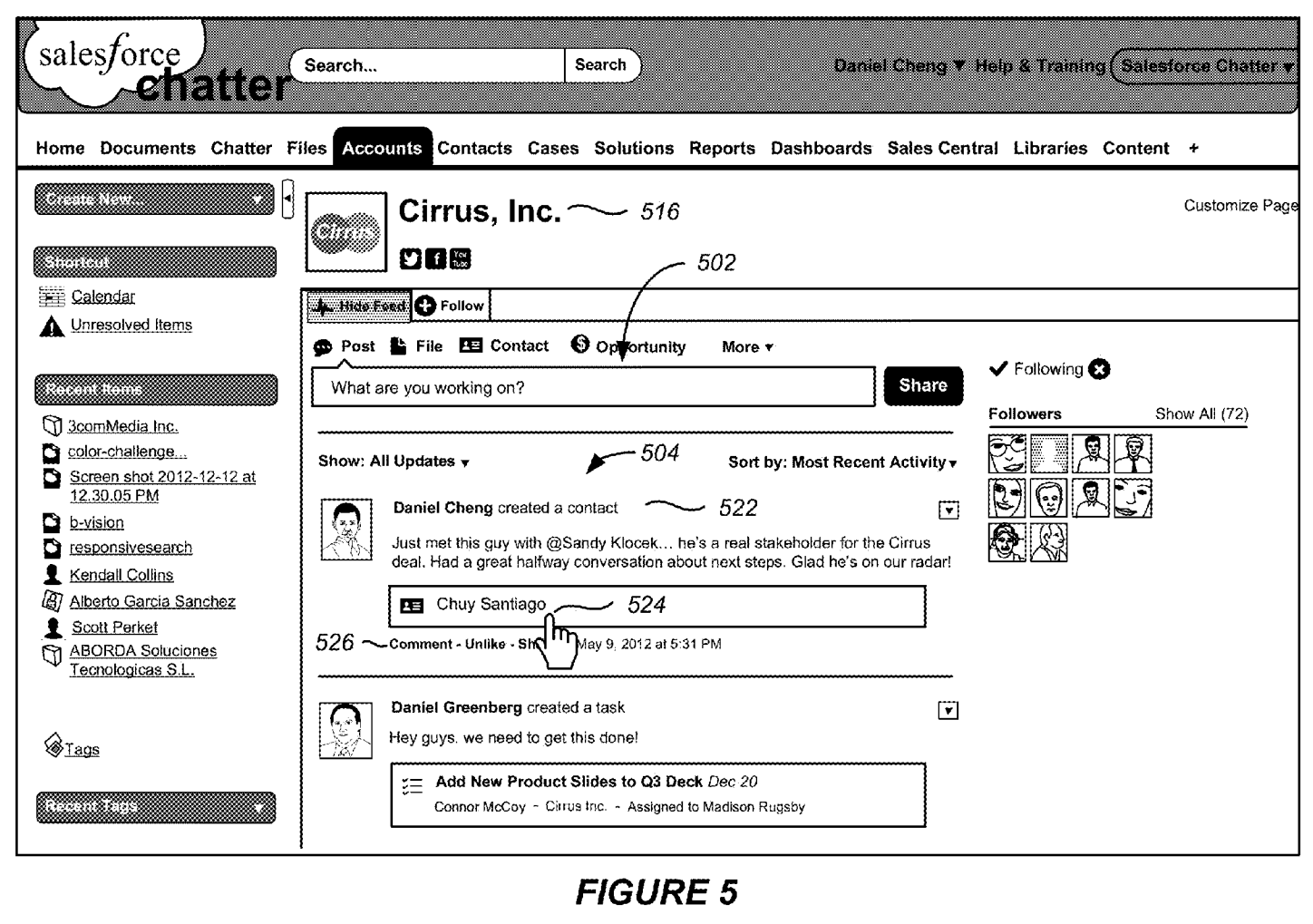

FIG. 5 shows an example of a database record with a user interface including a feed 504 with a feed item 522 presenting a newly created contact record, according to some implementations. The feed item 522 is presented at the top of the feed 504 for the parent record. The feed item 522 can include information regarding the action on the database record that was performed. The feed item 522 in FIG. 5 as displayed in the feed 504 of the accounts page 516 indicates that the user "Daniel Cheng created a contact". In some instances, the feed item 522 can include additional data provided in the data fields from the publisher 502. However, not all data provided in the data fields are necessarily displayed in the feed item 522. How such data is rendered in the feed item 522 may depend on contextual factors, such as the profile of the user viewing the feed item 522 and the page layout in which the feed item 522 is displayed. The feed item 522 also includes an actionable selection or selectable link 524 to the created or updated database record. In FIG. 5, the newly created contact record is displayed as a link 524 "Chug Santiago". A user may also perform various actions on the feed item 522, including posting a comment to the feed item 522, liking or disliking the feed item 522, or sharing the feed item 522. Such actions may affect the same feed item 522 as presented in other related feeds.

FIGS. 6A-6D show a series of user interfaces with a publisher 608 and a feed 604 for performing an action on a mobile device, according to some implementations. An API enables the publisher 608 to interface with a database system for any number of applications, including mobile device applications. In some implementations, an entity may develop the API for the publisher 608 so that any customer, partner, organization, or other user can write applications that utilize the API.

Figure 6A:
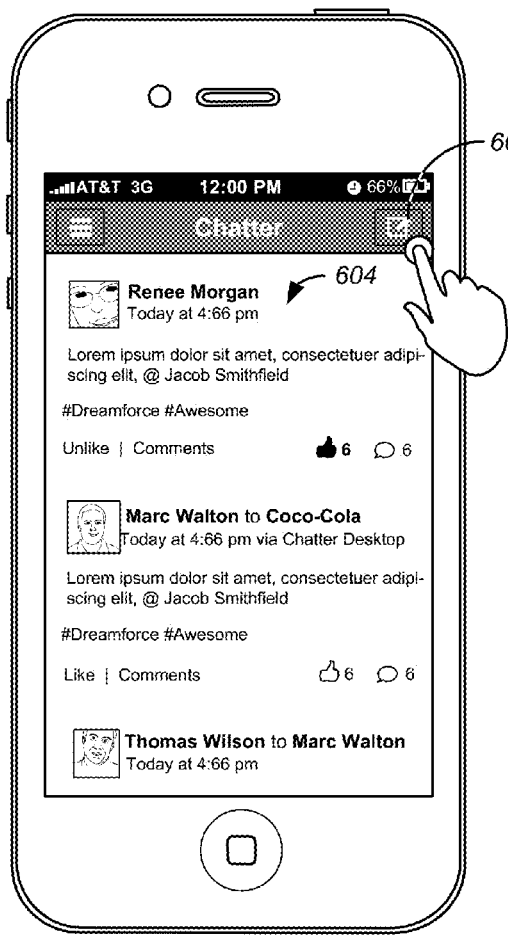
FIGS. 6A-6D show a series of user interfaces with a publisher and a feed for performing an action on a mobile device, according to some implementations.
Figure 6B:
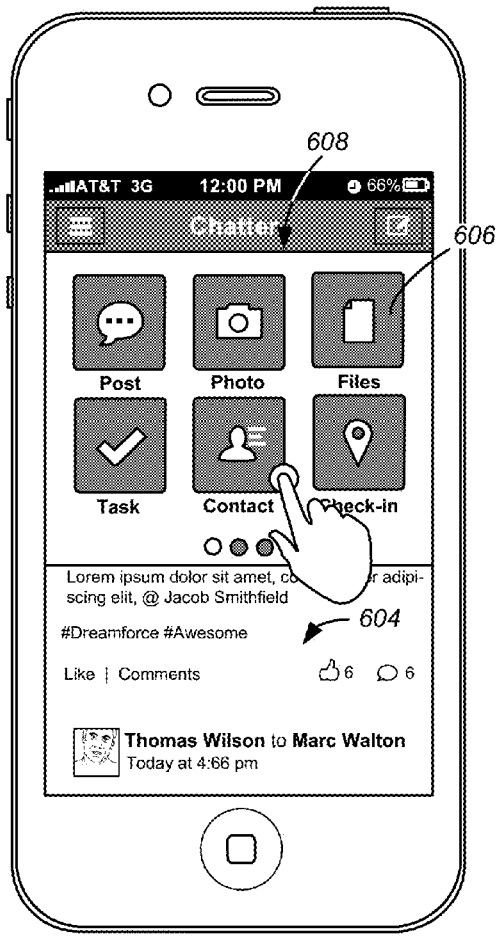
Figure 6C:
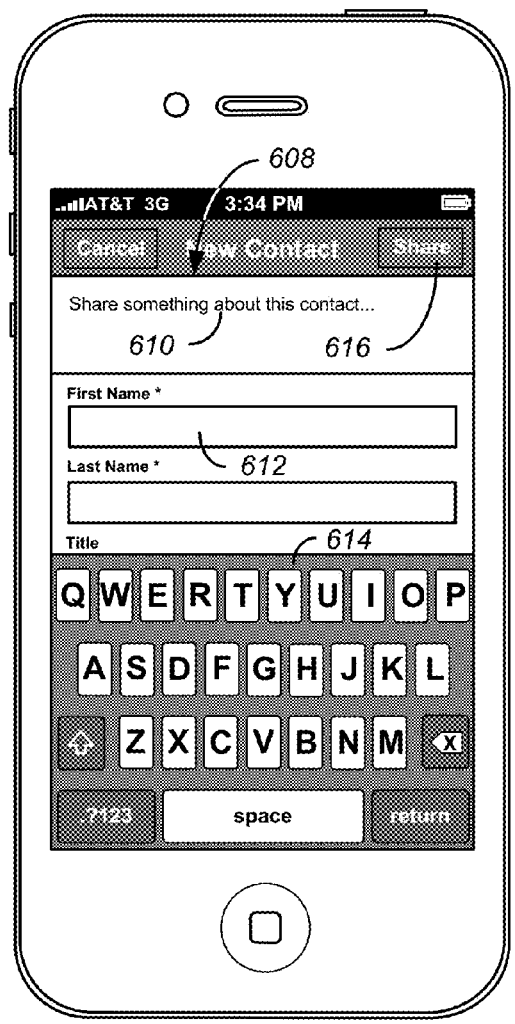
Figure 6D:
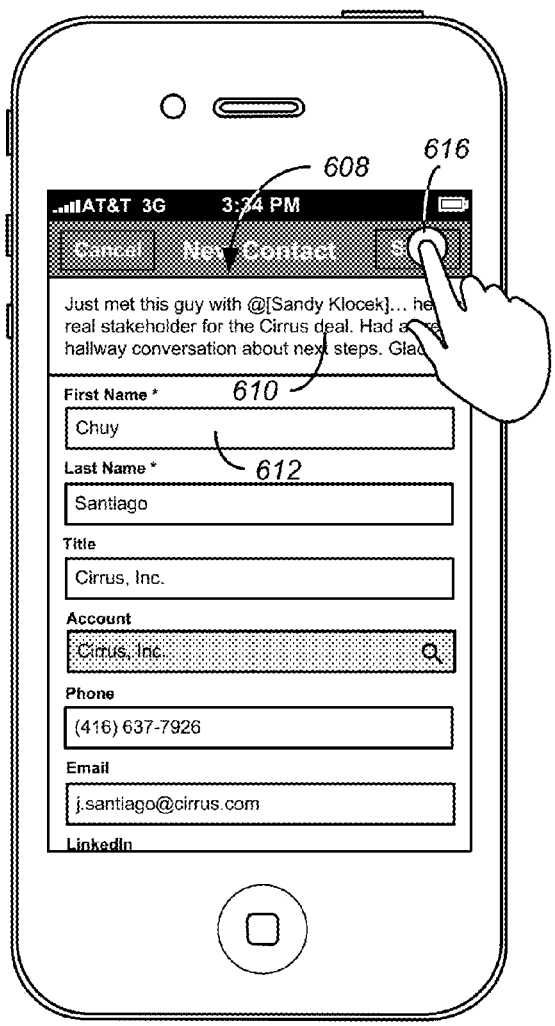

In FIG. 6A, a user interface for a mobile device may include a publisher button 602 and a feed 604. The publisher button 602 enables a user to access a publisher or actions menu 608 shown in FIG. 6B. The publisher 608 may cover over a portion of the feed 604 in the user interface of the mobile device. The user may select from among a plurality of publisher actions 606 in the publisher 608. Publisher actions 606 include "Post", "Photo", "Files", "Task", "Contact", and "Check-In". Selection of a publisher action 606 may cause the publisher to display content and/or data fields associated with the publisher action 606. As shown in FIG. 6C, selection of the contact publisher action 606 causes the publisher 608 to display a text box 610 for posting a message and a plurality of data fields 612 for creating a new contact. The newly created contact may be associated with the parent record of the feed 604. In some implementations of mobile device applications, selection of the publisher action 606 causes the user interface to display a keyboard 614. After populating the data fields 612 and/or text box 610 with information as shown in FIG. 6D, a user may select the share button 616 to publish the information to one or more appropriate feeds.

Figure 7:
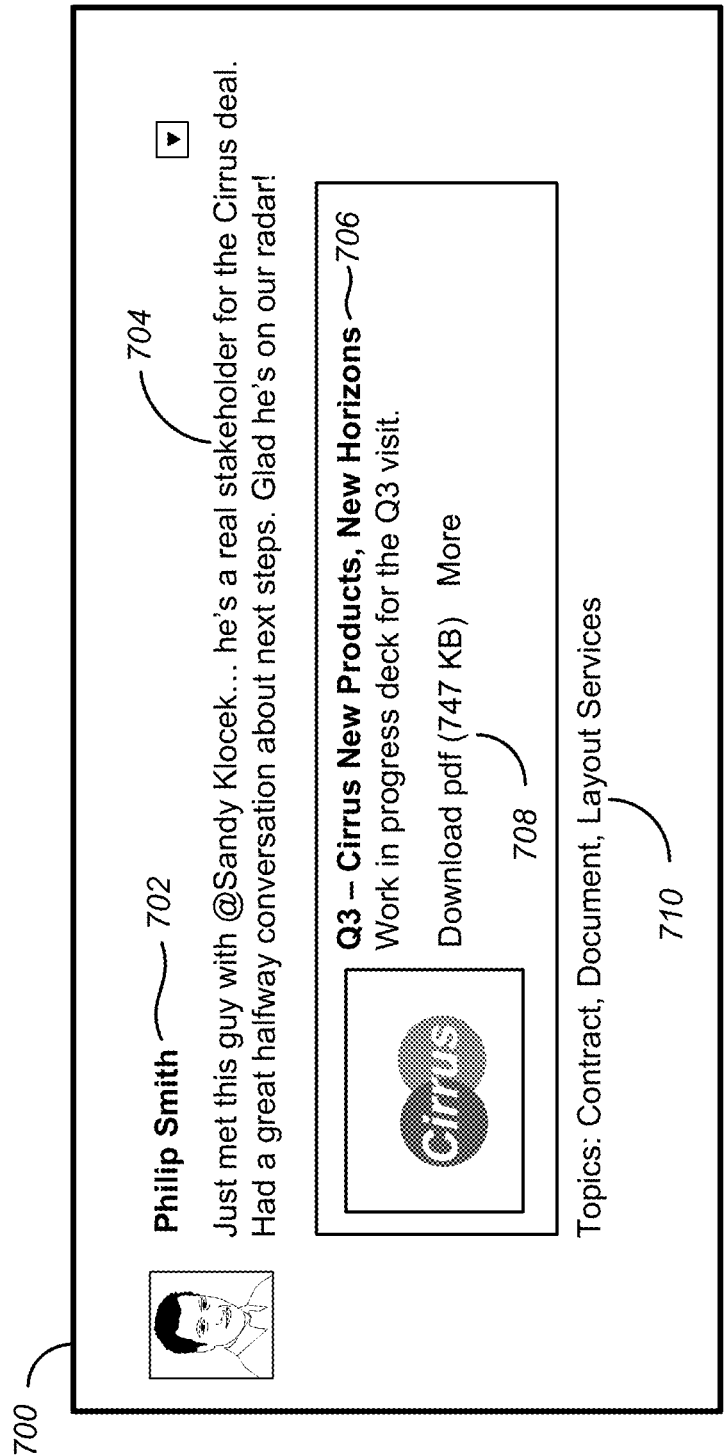
FIG. 7 shows an example of a feed item, according to some implementations.

A publisher may be configured to publish information to one or more feeds by creating a visual feedback element, such as a feed item. FIG. 7 shows an example of a feed item 700, according to some implementations. The feed item 700 may include data submitted from a publisher. The feed item 700 may appear as part of a feed in a user interface. Here, the feed item 700 includes the identity of the entity 702 updating or creating the database record, a message 704 accompanying data from the publisher, the name of the database record 706 being updated or created, an attachment 708, and topics 710. Other data from the publisher may also be presented in the feed item 700. In some implementations, the name of the database record 706 may be an actionable selection or selectable link that causes the user interface to display a page layout for the database record 706. What information is displayed in the feed item 700 may depend on contextual factors, such the profile of the entity viewing the feed item 700 and the page layout on which the feed item 700 is displayed.

The updated or created database record can be related to a parent record stored in the database system. Here, the parent-child relationship refers to a hierarchical relationship among database records in a database system. For example, an opportunity can be a child in relation to an account, while the account is the parent. In another example, a task can be a child in relation to a lead, while the lead is the parent.

In some implementations, updates to the database record can include conversion of the database record, deletion of the database record, attaching a file to the database record, logging information to the database record, downloading data from the database record, uploading data to the database record, and modifying data in data fields associated with the database record. Examples of updates to a database record can include but is not limited to approving or rejecting a workflow approval, logging a call, logging a task, logging a bug, adding a link, adding a "Thanks", etc. In some implementations, the database record may be a customer relationship management (CRM) object. A CRM object can include but is not limited to a lead, a case, an account, an opportunity, a task, a contact, a campaign, a contract, an event, a custom object, and a Visualforce page.

A determination can be made that a user has permission to perform the action on the database record to associate with the parent record. Conventionally, CRM systems limit the interaction with parent records to system administrators and owners of the parent records. As such, other users or groups cannot directly interact with a parent record without the assistance or permission of an owner or system administrator.

Determining whether an entity has permission to interact with the parent record can at least include identifying one or more entity attributes of a profile of the entity. Attributes of the profile of an entity can include, for example, an entity's role or definition, an entity's relationship information, an entity's preferences, an entity's usage patterns, and other metadata associated with an entity's profile. For example, an entity's role can indicate membership to a team that collaborates on a certain account record, and permission to interact with a parent record can be determined if the entity is a collaborator to that account record. In another example, an entity's role can indicate a job title in an organizational hierarchy. Depending on where the entity stands in the organizational hierarchy, the entity may or may not have permission to interact with a certain record.

Additionally, determining whether an entity has permission to interact with the parent record can at least include identifying one or more record attributes of the parent record. Attributes of the parent record can indicate the type of record, such as whether the parent record is a lead, a case, an account, an opportunity, a task, an event, a contact, or a custom object. Attributes of the parent record can also provide other metadata about the parent record. For example, a type of record can be a case, and the case can also be a technical issue case (e.g., bug) or an order processing case (e.g., deal) for an account. One entity may be permitted to interact with the technical issue case but not the order processing case, and vice versa.

Moreover, determining whether an entity has permission to interact with the parent record can at least include comparing the one or more entity attributes with the one or more record attributes. For example, if an entity is identified as Vice President of Sales, then he can access and interact with all cases for an account. If an entity is identified as a Sales Associate, then he can access and interact with limited types of cases for an account, such as cases involving a particular product, for example.

In some implementations, even if an entity has permission to interact with the parent record, the types of interactions can be limited. Such limitations can be established, for example, by a system administrator, an owner of the parent record, or an organization's security/permissions policy, among others. In some implementations, an entity may be restricted to perform only certain actions for interacting with the parent record. Thus, a publisher in the user interface may disable, hide, or otherwise not display at least some publisher actions from the entity. For example, one entity may be able to view, update, and create opportunities related to an account, and another entity may be able to only view and update opportunities related to the same account. In some implementations, an entity may be restricted to view only certain types of information or options for interacting with a parent record. For example, one entity may be able to update all the terms for a contract, and a different entity may be able to update only certain terms for the same contract. In another example, one entity may be able to view public and private information related to an account, and a different entity may be able to only view publicly available information related to the same account.

In some implementations, data fields in the publisher may be configured to receive data from a user. The data may be communicated to one or more computing devices performing the method 300, for instance, as a signal network 14 in FIGS. 1A and 1B. For example, an event record may include field data such as date and time of the event, the names of invitees, and the venue. In another example, a task may include field data such as the name of the task, name or names of the assignee to the task, and a due date. The values in each of the data fields may be used to perform the requested action to create or update the database record to associate with the parent record. The database record may be stored or configured to be stored in the database system associated with the on-demand database service. Upon receiving the data, one or more servers associated with the on-demand database service can create or update a row representing the database record in the database system. For example, in logging an action to the database record, an update may be performed after an email is sent and then logged to the database record, or after a post is submitted to an online social network like Twitter® or Facebook® and then logged to the database record. In effect, the publisher can perform actions that have behaviors outside of the network domain of the database record.

A feed item associated with the performed action is presented for inclusion in a feed in the user interface. The feed item includes one or more actionable selections or selectable links providing a reference to the database record. The reference to the database record can be a display component such as a menu, link, or graphical button. In some implementations, the reference to the database record can open a page in the user interface for the database record. In this way, a user can navigate to the database record directly from the feed item. It is not necessary for a user to navigate between database records by switching between different user interfaces.

In some implementations, the reference to the first record can perform further actions with respect to the database record. In addition to opening the database record, such actions may include but is not limited to creating a second database record, deleting the database record, updating the database record, converting the database record, attaching a file to the database record, downloading data from the database record, and uploading data to the database record. More specifically, examples of actions may include creating a task, updating a task, creating an opportunity, updating an opportunity, creating a contact, updating a contact, creating a case, updating a case, creating an account, updating an account, creating an event, updating an event, logging a call, logging a task, logging a bug, approving a workflow approval, rejecting a workflow approval, creating an email, writing a note, creating a poll, closing a case, completing a task, closing a bug, sending an email, submitting an email for approval, posting to a portal, posting to a social network, adding a link, and adding a "Thanks". Thus, actions may be performed directly from the feed item to associate with the database record without navigating to another page.

In some implementations, selecting the one or more actionable selections or selectable links may cause the publisher to be operable to receive second information. The second information may be used to perform an action to associate with the database record. For example, the action may include creating a second database record to associate with the first database record. The second database record may have a parent-child relationship with the database record. In some implementations, the second database record is a child of the database record.

Figure 8:
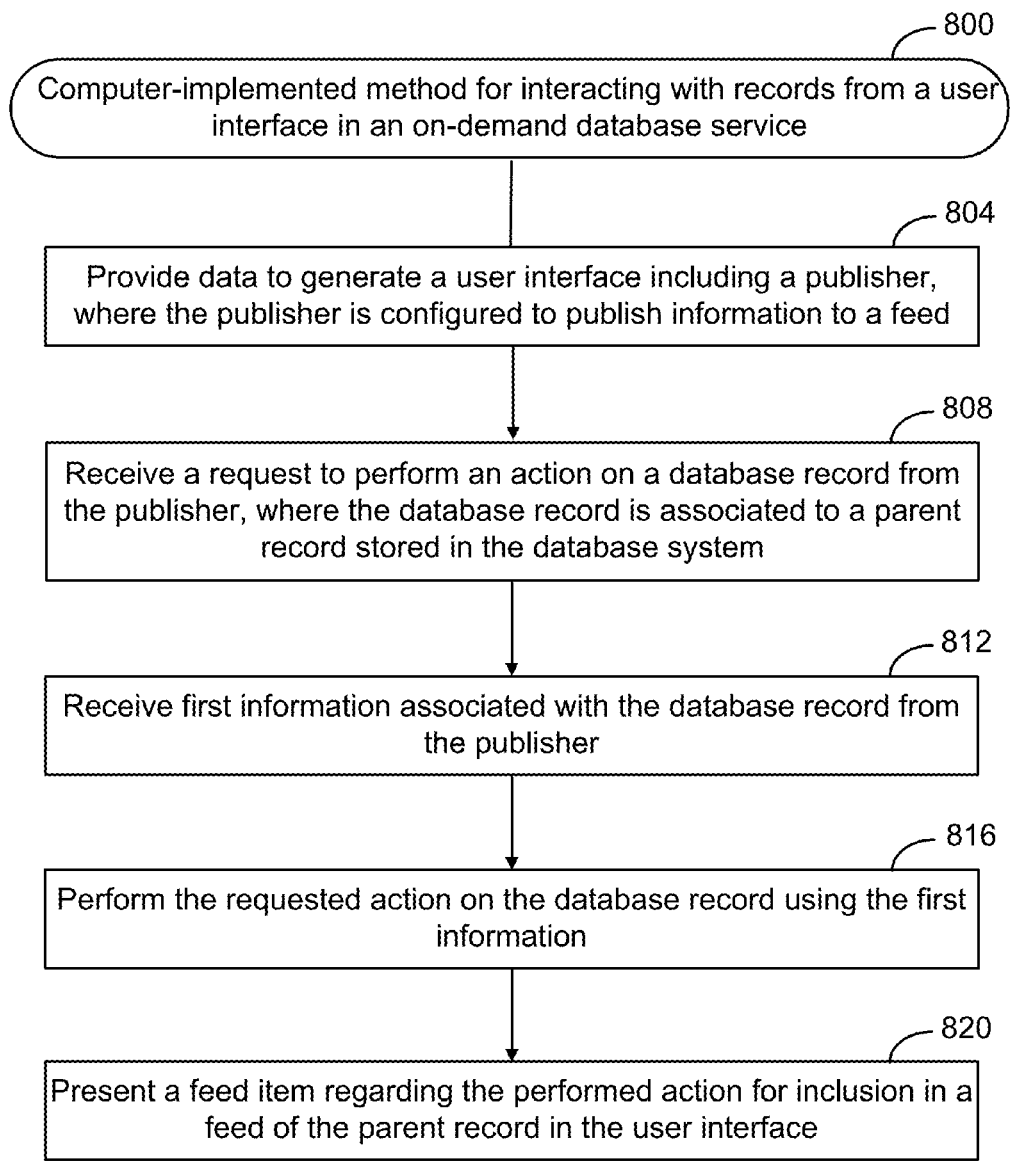
FIG. 8 shows a flowchart of an example of a computer-implemented method for interacting with records from a user interface in an on-demand database service, performed in accordance with some implementations.

FIG. 8 shows a flowchart of an example of a computer-implemented method 800 for interacting with records from a user interface in an on-demand database service, performed in accordance with some implementations. At block 804, data is provided to generate a user interface including a publisher. The publisher is configured to publish information to a feed. In some implementations, the publisher may be configured to display data fields for receiving data for performing the action on the database record. The publisher may include selectable actions for performing actions on a database record stored or configured to be stored in a database system associated with an on-demand database service. The publisher publishes information to a feed of the parent record, where the parent record is associated with the database record in a parent-child relationship. In some implementations, the selectable actions may be tabs across a publisher interface. In some implementations, the selectable actions may be buttons in an actions menu. How the selectable actions are presented in the user interface can depend on the context of the screen in that a user is viewing.

At block 808, a request to perform an action on a database record is received from the publisher. The database record is associated to a parent record stored in a database system. A user input selection can cause the action to be initiated via the platform's API and method call associated with the action. The user input selection can launch an action for interacting with the database record, such as creating the database record or updating the database record.

At block 812, first information associated with the database record is received from the publisher. In some implementations, a user may provide the first information via data fields associated with the database record. The first information may be communicated to one or more computing devices performing the method 800, for instance, as a signal network 14 in FIGS. 1A and 1B. The first information may represent entries of data in the data fields, and the first information is used in performing the action on the database record.

At block 816, the requested action is performed on the database record using the first information, where the performed action includes creating or updating the database record to associate with the parent record. Rather than simply posting messages or attaching files through a publisher in a user interface to a feed of a parent record, the publisher can also perform actions on database records to associate with the parent record. The performed actions can be represented as a feed item on the feed of the parent record. The performed action can create a database record, such as a CRM object. Or, the performed action can update a database record, including approving or rejecting a workflow approval, logging a call, logging a task, logging a bug, adding a link, adding a "Thanks", etc.

At block 820, a feed item regarding the performed action is presented for inclusion in a feed of the parent record in the user interface. The feed item may provide a visual feedback element representing the first information from the publisher in the feed of the parent record. While the feed item may be presented for inclusion in a number of different feeds, as will be discussed in more detail below, the feed item may be at least presented for inclusion in the feed of the parent record. In some implementations, the feed item may include one or more selectable links providing a reference to the database record. In other words, the one or more selectable links can be selected by a user to reference the newly created or updated database record. As a result, a user can navigate to the database record directly from the feed item. For example, when a user creates a contact record such as "Chuy Santiago" as illustrated in FIG. 5, a selectable link to the contact record is displayed in the feed item. The contact record of "Chuy Santiago" is automatically associated with the account record of "Cirrus, Inc.," where the account record is a parent record and the contact record is a child record. Selection of the selectable link may permit the user to perform additional actions, either on the contact record itself or on a second database record.

In some implementations, the reference to the database record can perform further actions with respect to the database record. Such actions may include creating a second database record, deleting the database record, updating the database record, converting the database record, attaching a file to the database record, downloading data from the database record, uploading data to the first record, viewing information associated with the database record, and otherwise performing an action on the database record (e.g., logging a call, creating an email, approving or rejecting a workflow approval, etc.). In some instances, selecting the one or more selectable links may cause the publisher to be operable to receive second information.

In some implementations, one or more entities cross-referenced with the feed item are identified. The feed item can be propagated and cross-referenced for display not only in the feed of the parent record, but also in other related feeds. Identification of such related feeds can occur by, for example, a user defining values in a payload or a system administrator hard-coding the values. In addition or in the alternative, cross-referencing rules can be embodied in code. Potential entities for cross-referencing may be provided in a database table indicating record relationship information with respect to the parent record. Once a feed of another entity other than the parent record is identified, a database can be accessed to indicate the entity as being cross-referenced with the feed item. As used herein, this process of identification and indication can be referred to as "cross-referencing." In some instances, any interactions performed on a given feed item such as commenting or liking the item are also presented on every other related feed including a feed item which is cross-referenced, so that a single conversation thread is preserved and replicated across feeds. This can allow users or organizations to view and interact with the same feed item from multiple and different page layouts. In some implementations, the feed item parented by the parent record can be propagated and cross-referenced for access by followers of a cross-referenced entity. For example, depending on whether the feed item is relevant or of interest, the feed item can be provided in news feeds of users who follow a cross-referenced entity.

In some implementations, cross-referenced feed items may be rendered differently depending on context. A "context" can refer to a screen that the user is currently viewing on the display. This can include, for example, a feed, a user's profile, a feed comment, a detailed information page, etc. A server API can be invoked with a set of parameters that describe the context. For example, the preamble of the cross-referenced feed item or the auxiliary body of the cross-referenced feed item may present different information in different feeds.

In some implementations, the feed item regarding the performed action (e.g., created or updated database record) is provided in one or more feeds of the one or more entities cross-referenced with the feed item. Thus, the same feed item as displayed in the feed of the parent record may be propagated and displayed across multiple users, groups, organizations, and records. Cross-referencing of a feed item across multiple users, groups, organizations, and records may be preferred over copying or re-posting the feed item in different places. For example, collaborators for a particular database record can interact with the feed item from their news feed, the record feed of the parent record, or the record feed of the database record if the feed item is cross-referenced with such entities.

In some implementations, a user input may be received selecting a selectable link in the feed item. Selection of the selectable link can cause the publisher to display, in response to the user input, data fields capable of receiving second information to update the database record or create a second database record. The database record can have a hierarchical relationship with the second database record, where the database record can be a parent record and the second database record can be a child record of the database record and a grandchild of the parent record. The data fields displayed in the publisher can be different than the data fields displayed in the publisher for performing the action on the database record.

In FIG. 8, in one example, an app server 288 in the on-demand service environment 200 of FIGS. 2A and 2B includes one or more processors configured to perform part or all of blocks 804-820. In other instances, additional servers cooperate with app server 288 to perform the blocks. When first information, for example, is received at block 812, such information can be received by a server over a data network from a user operating a user system 12 as shown in FIGS. 1A and 1B. In other instances, such data is received from a proxy server on behalf of a user or other data source. Various implementations of method 800 are possible, such that any of the servers described above with reference to FIG. 2B or other computing devices disclosed herein can be configured to receive and process user inputs and information updates in accordance with method 300.

Actions associated with the selectable links may be provided programmatically or declaratively. The actions may be configured to interact with database records according to custom action instructions. The custom action instructions may be provided using an API. In some implementations, the custom action instructions may be provided in, for example, Javascript®, Java®, Apex™, or any other programming language. In some implementations, a customization tool, such as Visualforce, allows users to build custom user interfaces that can be hosted natively in an on-demand service environment. Rather than declaratively defining the user interface, a customization tool allows users to programmatically customize the user interface. For example, a user may customize the user interface components that should be included on a page and how they should appear. The user can edit Visualforce tags, HTML, Javascript, or other Web-enabled code. Examples of custom actions that a user may add to the user interface may include, by way of example only, instant messenger, knowledge articles, live chat, twitter, virtual bulletin boards, email, log a call, portal answer, or the like.

The user interface may be defined by custom action instructions either declaratively utilizing an API, such as one provided by salesforce.com, or programmatically utilizing a customization tool such as Visualforce, which may be provided with its own API and set of pre-defined instructions. Users with less technical skills may develop user interfaces declaratively, while users or organizations with more complex data management needs may prefer a customization tool in customizing user interfaces.

An example of instructions for creating such a Visualforce page layout is shown below:

```
<apex:page standardController="Case">
    <!-- Repositions publisher tabs to a horizontal arrangement on top of
the page -->
        <ul class="demoNav" style="list-style: none; overflow: hidden">
            <li style="float:left"><a id="custom_email_tab"
class="selected"
href="javascript:void(0);"
onclick="getDemoSidebarMenu( ).selectMenuItem('custom_email_tab');"><span
class="menuItem">Email Customer</span></a></li>
            <li style="float:left"><a id="custom_log_call_tab"
href="javascript:void(0);"
onclick="getDemoSidebarMenu( ).selectMenuItem('custom_log_call_tab');"><span
class="menuItem">Log Call</span></a></li>
            <li style="float:left"><a id="custom_portal_tab"
href="javascript:void(0);"
onclick="getDemoSidebarMenu( ).selectMenuItem('custom_portal_tab');"><span
class="menuItem">Portal Answer</span></a></li>
            <li style="float:left"><a id="custom_detail_tab"
href="javascript:void(0);"
onclick="getDemoSidebarMenu( ).selectMenuItem('custom_detail_tab');"><span
class="menuItem">Case Details</span></a></li>
        </ul>
        <!-- Email publisher -->
        <div id="custom_email_pub_vf">
            <apex:emailPublisher entityId="{!case.id}"
                width="80%"
                emailBodyHeight="10em"
                showAdditionalFields="false"
                enableQuickText="true"
                toAddresses="{!case.contact.email}"
                toVisibility="readOnly"
                fromAddresses="support@cirrus.com"
                onSubmitSuccess="refreshFeed( );" />
```

```
        </div>
        <!-- Log call publisher -->
        <div id="custom_log_call_vf" style="display:none">
            <apex:logCallPublisher entityId="{!case.id}"
                width="80%"
                logCallBodyHeight="10em"
                reRender="demoFeed"
                onSubmitSuccess="refreshFeed( );" />
        </div>
        <!-- Portal publisher -->
        <div id="custom_portal_vf" style="display:none">
            <support:portalPublisher entityId="{!case.id}"
                width="80%"
                answerBodyHeight="10em"
                reRender="demoFeed"
                answerBody="Dear {!Case.Contact.FirstName},\n\nHere is
the solution to                 your case.\n\nBest regards,\n\nSupport"
                onSubmitSuccess="refreshFeed( );" />
        </div>
        <!-- Case detail page -->
        <div id="custom_detail_vf" style="display:none">
            <apex:detail inlineEdit="true" relatedList="true"
rerender="demoFeed" />
        </div>
        <!-- Include library for using service desk console API -->
        <apex:includeScript value="/support/console/25.0/integration.js"/>
        <!-- Javascript for switching publishers -->
        <script type="text/javascript">
            function DemoSidebarMenu( ) {
                var menus = {"custom_email_tab" : "custom_email_pub_vf",
                    "custom_log_call_tab" : "custom_log_call_vf",
                    "custom_portal_tab" : "custom_portal_vf",
                    "custom_detail_tab" : "custom_detail_vf"};
                this.selectMenuItem = function(tabId) {
                    for (var index in menus) {
                        var tabEl = document.getElementById(index);
                        var vfEl = document.getElementById(menus[index]);
                        if (index == tabId) {
                            tabEl.className = "selected";
                            vfEl.style.display = "block";
                        } else {
                            tabEl.className = "";
                            vfEl.style.display = "none";
                        }
                    }
                };
            }
            var demoSidebarMenu;
            var getDemoSidebarMenu = function( ) {
                if (!demoSidebarMenu) {
                    demoSidebarMenu = new DemoSidebarMenu( );
                }
                return demoSidebarMenu;
            };
        </script>
        <!-- Javascript for firing event to refresh feed in the sidebar -->
        <script type="text/javascript">
            function refreshFeed( ) {
    sforce.console.fireEvent('Cirrus.samplePublisherVFPage.RefreshFeedEvent',
null, null);
            }
        </script>
    </apex:page>
```

Accordingly, the user interface for the Visualforce page layout can include a publisher and an information feed. The user can customize the publisher to be able to be an email publisher, a call log publisher, and a portal answer publisher. In other words, the publisher may include custom actions configured to email a customer, to log a call, and to answer inquiries through a web portal. The layout and dimensions of the publisher and other frames in the page layout hosting components such as the feed may be defined in the custom action instructions according to the user's preferences.

In some implementations, the publisher can expose content from an application via an API. The application can be exposed within a publisher space, and interactions can be performed on the application through the publisher space via the API. The application can be integrated with the API provided by a database service provider, such as salesforce.com.

In some implementations, the application is hosted natively in the on-demand service environment. In some implementations, the application is hosted on a third-party platform. The third-party platform may include one or more database systems outside of the on-demand service environment. The application can be hosted on a platform service, including but not limited to site.com™, Heroku™, force.com®, and AppExchange®.

While the actual code for running the application may be hosted on the third-party platform, the application is configured to communicate with the API provided in the on-demand service environment. This API may enable integration of an application, such as a third-party application, into the on-demand service environment. For example, the API may consist of a set of tools and Javascript APIs that enables integration with the third-party application into the on-demand service environment. The Javascript APIs provide a communication bridge so that the third-party application can communicate with a browser page.

Content as exposed in the publisher space can originate from any number of data sources. In some implementations, such data sources can include analytics, external data sources, feeds, and direct events, among other data sources. For example, the exposed content can be a video stream provided from a videoconferencing service. In another example, the exposed content can be a map provided from a web mapping service application. The publisher space provides a frame or window by which the content can be viewed in the user interface, and the content from the data source can interface with the API to communicate with the browser page. For example, one of the publisher actions can be an API-enabled action that can interface with the API and cause the API to display content from an external data source.

In some instances, exposure of the application in the publisher may be performed using a force.com® Canvas application. The Canvas application serves as an iFrame or a window for displaying the content from the application. The application itself may be hosted on a third-party platform, such as Heroku™.

From a user interface, a user can communicate with an application, such as a third-party application, via the API. Even if the application is hosted on a third-party platform, the application directly interfaces with the API to implement updates with the hosting page. In some implementations, an interaction occurs within the browser page of the user interface. For example, the application can be a mortgage calculator exposed in the publisher where the interaction outputs directly into the publisher. In some implementations, the interaction does not occur with the browser page of the user interface. Instead, the interaction occurs with the API and the third-party application that avoids opening or refreshing a page in the browser. In other words, the browser page is unaware of the updates made to the application hosted on the third-party platform. In some implementations, the feed directly interfaces with the API to update information in the feed. As the API communicates with the application, the API links back information from the application to the browser page. Such information is rendered in the feed of the parent record. In some implementations, the feed is updated without refreshing the user interface. In fact, each of the steps performed in interacting with the application may occur without refreshing the user interface. For example, updating the feed can involve updating one or more data fields in the feed based on the user input by "toggling" changes to one or more data fields. Therefore, the API can enable interactions between a user and an exposed application, such as an application hosted on a third-party platform, such that updates occur seamlessly between a publisher and a feed in a user interface.

In some implementations, a feed item in the feed can include one or more actionable selections. The one or more actionable selections may perform further operations on the application from the feed item. By way of an example, various itineraries from a travel service application may be exposed in a publisher, and a user may select one or more of the itineraries. In response to a user input requesting approval for a selected itinerary, information regarding the selected itinerary can be rendered in a feed item. The feed item can further include approval controls, where an appropriate entity can approve or deny the selected itinerary.

In another example, a user interface can include a publisher and a feed where the publisher includes a selectable action for initiating a videoconference with a customer. The customer can use a video recording device and have a real-time conversation with the user through a publisher space of the publisher. Moreover, the user can perform an action on the exposed data stream by saving the videoconference from the publisher, and the saved video can be published to the feed.

In yet another example, a pharmaceutical company can develop a customized user interface for sales agents to sell free drug samples to doctors. When a sales agent pulls up an account for a particular doctor in the user interface, the sales agent can view the doctor's account and input new orders into the publisher. The sales agent can communicate with an application, such as a third-party application, to fulfill the order request, and a feed item can be posted in a feed indicating the placement of the order request.

In yet another example, a gaming company can develop a customized user interface to submit a mass email to customers. If a flood of cases come in at a rapid rate regarding a bug in a video game, the gaming company can utilize a publisher to communicate with a mass email web service such as VerticalResponse Inc. or Constant Contact®, Inc. The gaming company can import or select all the recipients, compose the email, and submit the email through the mass email web service. Upon completion, a feed can be updated by presenting a feed item indicating that an email was sent out.

A publisher can be an interface that interacts with one or more records with information regarding the interaction being published to one or more feeds. In some implementations, the publisher can be the interface that handles the creation of one or more records. For example, the publisher can be a composer that handles the creation of objects, such as a poll, a contact, a task, etc. The publisher may be part of a framework for creating various composers, such as a poll composer, a contact composer, a task composer, etc. Such a framework may be referred to as a "publisher framework." The publisher framework may be a native framework for any one or more operating systems, including but not limited to Android, iOS, and Windows.

In some implementations, the publisher framework may be configured to automatically discover any composer class. Thus, upon loading the publisher in the operating system, the publisher can automatically discover one or more classes of composers without having to register each of the classes of composers. In some implementations, one or more protocols and/or base classes can provide support for the publisher in one or more mobile devices, including the iPad and iPhone. Each of these mobile devices can have a form factor that the publisher can be adapted for.

Figure 9:
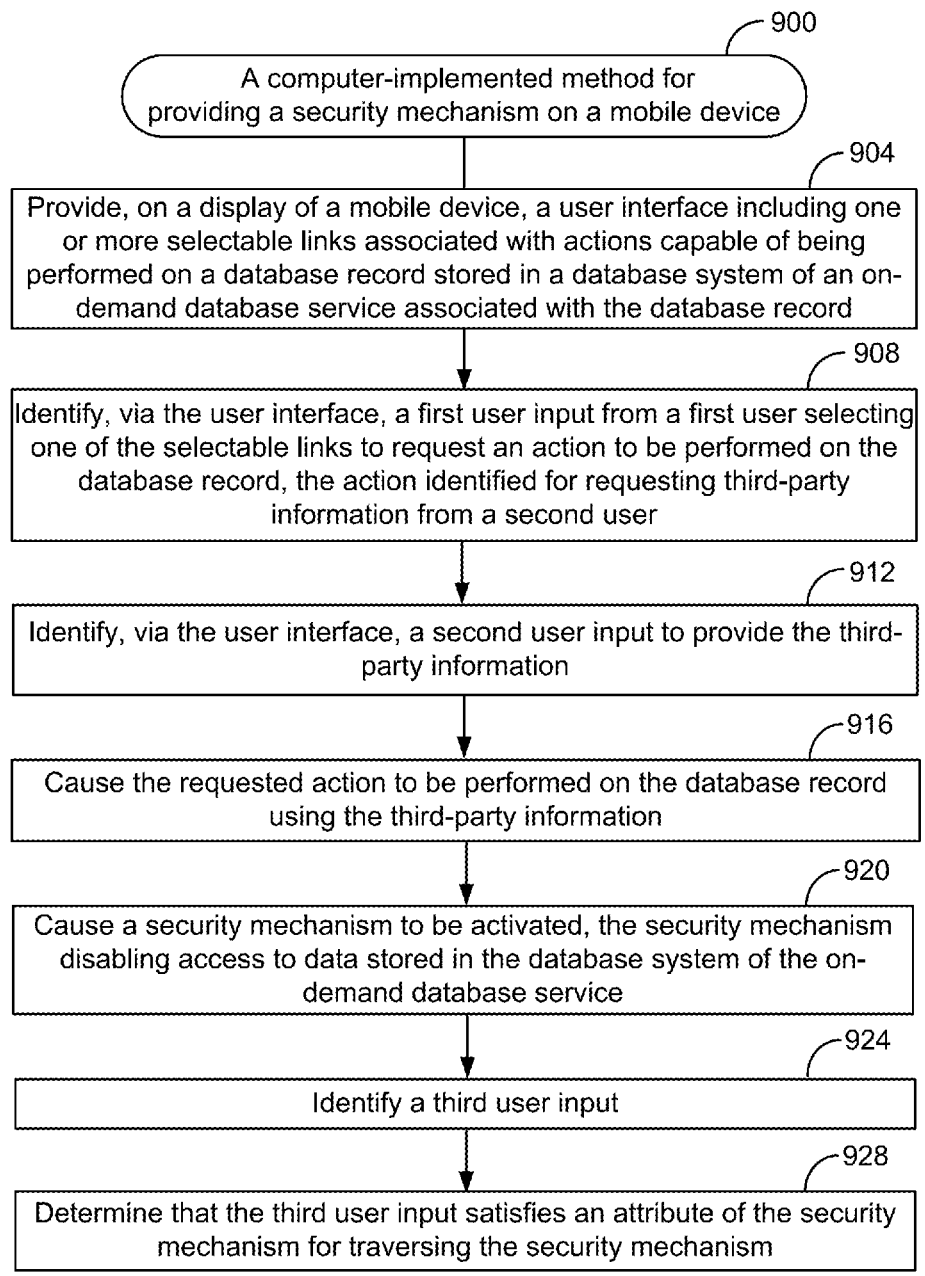
FIG. 9 shows a flowchart of an example of a computer-implemented method for providing a security mechanism on a mobile device, performed in accordance with some implementations.

III. Providing a Security Mechanism Before Performing an Action on a Database Record FIG. 9 shows a flowchart of an example of a computer-implemented method for providing a security mechanism on a mobile device, performed in accordance with some implementations. The operations in the method 900 may be performed in different orders and/or with different, fewer, or additional operations. The method 900 is described with reference to FIGS. 10A-10G.

In some implementations, a mobile device may be configured to perform part or all of the computer-implemented method 900. The mobile device can include the hardware and software of a user system 12 as described above with reference to FIGS. 1A and 1B. By way of example, the mobile device can be a smartphone, a tablet, a laptop computer, or a wearable display device such as Google Glass.

At block 904 of FIG. 9, a user interface is provided on a display of a mobile device. The user interface includes selectable links associated with actions capable of being performed on a database record stored or configured to be stored in a database system of an on-demand database service. In some implementations, the database system is an online social networking database system. The user interface may include a publisher for publishing information to a feed as described earlier herein. The publisher may include each of the selectable links for performing the actions on the database record. In some implementations, the action performed on the database record associates or is associated with a parent record of the database record. Each action can perform a type of transaction on the platform using the platform's API and the action's associated method call. For example, the action can update a database record, create a database record, log a call, send an email, approve/reject a workflow, etc.

When a user selects any of the selectable links, an action can be initiated. The action can interact with a database record stored or configured to be stored in a database system of the on-demand database service. For example, the action may perform one of the following: creating a database record or updating a database record for storing in a database system of the on-demand database service. In some implementations, updating the database record can include modifying data associated with the database record, deleting the database record, converting the database record, or advancing a workflow associated with the database record.

What selectable links are presented in the user interface can depend on a context in which the user is navigating in. A context can refer to a screen that the user is currently viewing on the display. This can include, for example, a feed, a user's profile, a feed comment, a detailed information page, etc. A server API can be invoked with a set of parameters that describe the context. Based on the parameters provided by the server API, the server API can provide a list of actions filtered based on that context. Any actions that are not applicable in that context are not provided in the user interface.

From a feed, for example, a user may see selectable links for global publisher actions. Global publisher actions can create database records or perform other functions independent of any database record in the on-demand database service. From a record page, however, a user may see selectable links for object-specific publisher actions. Object-specific publisher actions may update a database record, create a database record, or otherwise perform a function related to a specific database record in the on-demand database service. For example, an object-specific create action can create a database record that is automatically associated with the parent database record. To illustrate an example of context-awareness, if a user's context is a detailed information page for a contact record, then the server API can filter the object-specific actions to include at least logging a call and sending an email for that contact record. The server API can filter object-specific actions or global actions that are not applicable for the user's context, such as posting a comment on a feed, converting a lead to an opportunity, etc.

In some implementations, selection of the selectable link can cause the publisher or user interface to be capable of receiving information to use with the performance of the action on the database record. In some implementations, the user interface may include data fields for receiving entry of data to associate with the database record. The user interface may include a publisher space for receiving information to associate with the database record. In some implementations, the user interface may expose an application, such as a third-party application, for receiving information to associate with the database record. A third-party application can be exposed using a set of tools and APIs, such as force.com Canvas to integrate the third-party application with the on-demand database service. Content can be exposed from the third-party application, and a user may interact with the third-party application as if it were hosted natively on the on-demand database service.

Figure 10A:
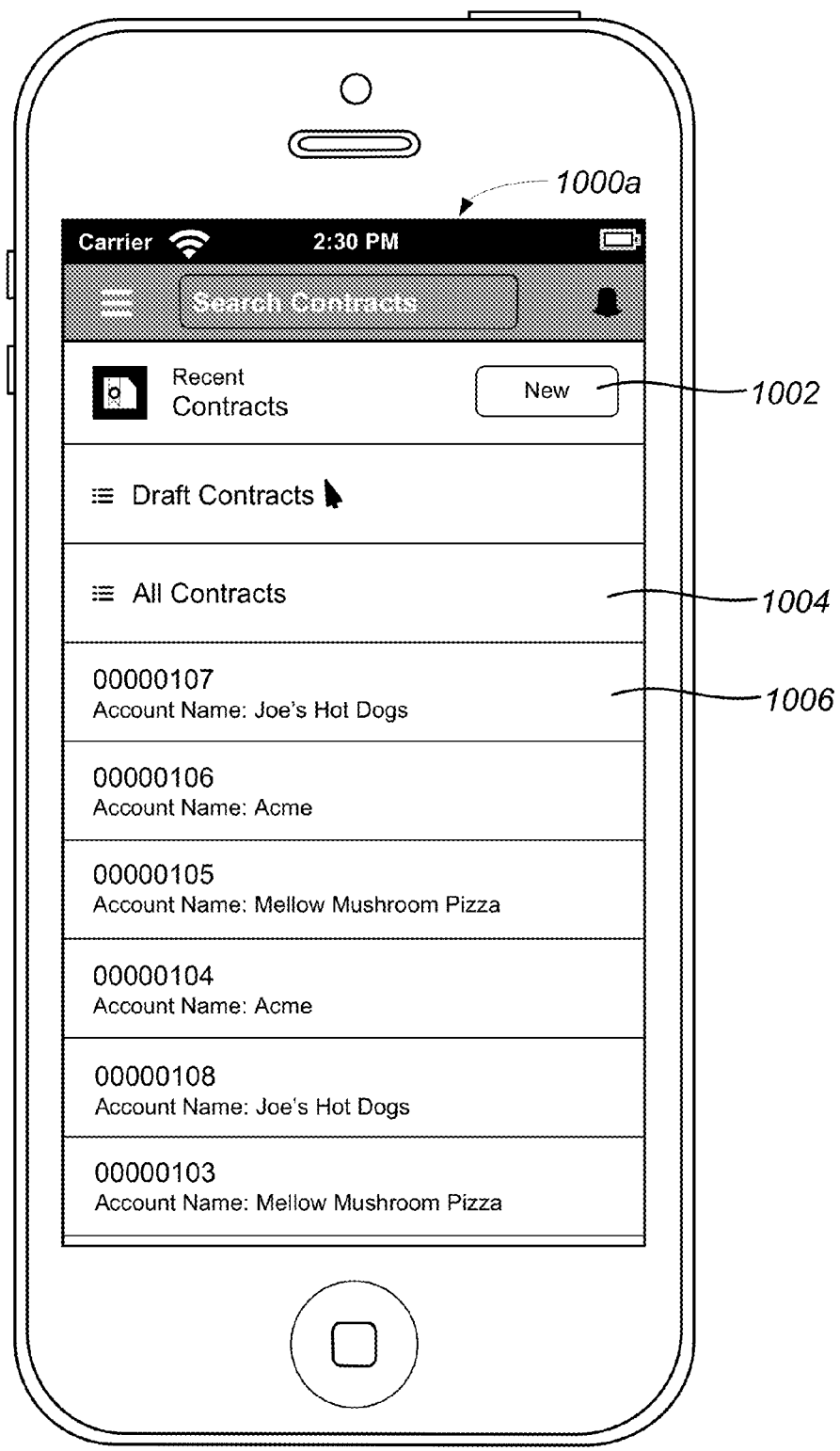
FIG. 10A shows an example of a user interface on the mobile device including a list of contracts, according to some implementations.3

FIG. 10A-10G show a series of user interfaces on a mobile device for providing a security mechanism, according to some implementations. FIG. 10A shows an example of a user interface 1000a on the mobile device including a list of contracts 1004, according to some implementations. A user can navigate through to various database records in the on-demand database service. In FIG. 10A, a user can search through contracts 1004 stored in a database system associated with the on-demand database service. The user can access various contracts 1004 provided in the user interface 1000a, where each of the contracts 1004 may be associated with an account. The association between an account and a contract may be a hierarchical relationship, such as a parent-child relationship. From the user interface 1000a, the user can select one of a plurality of contracts 1004 associated with an account. For example, the user can select a contract 1006 under the account "Joe's Hot Dogs." Alternatively, the user can choose to draft a new contract by selecting a "New" button 1002.

Access to such data may be permitted when the user is authorized to the database system of the on-demand database service. Authorization may occur when the user's access credentials are validated. When the user's access credentials are validated, then the user may be provided with read-write access to data stored in the database system of the on-demand database service. For example, the user may have read-write access to the plurality of contracts 1004 in FIG. 10A. The user may access the plurality of contracts 1004 through an application associated with the on-demand database service.

Figure 10B:
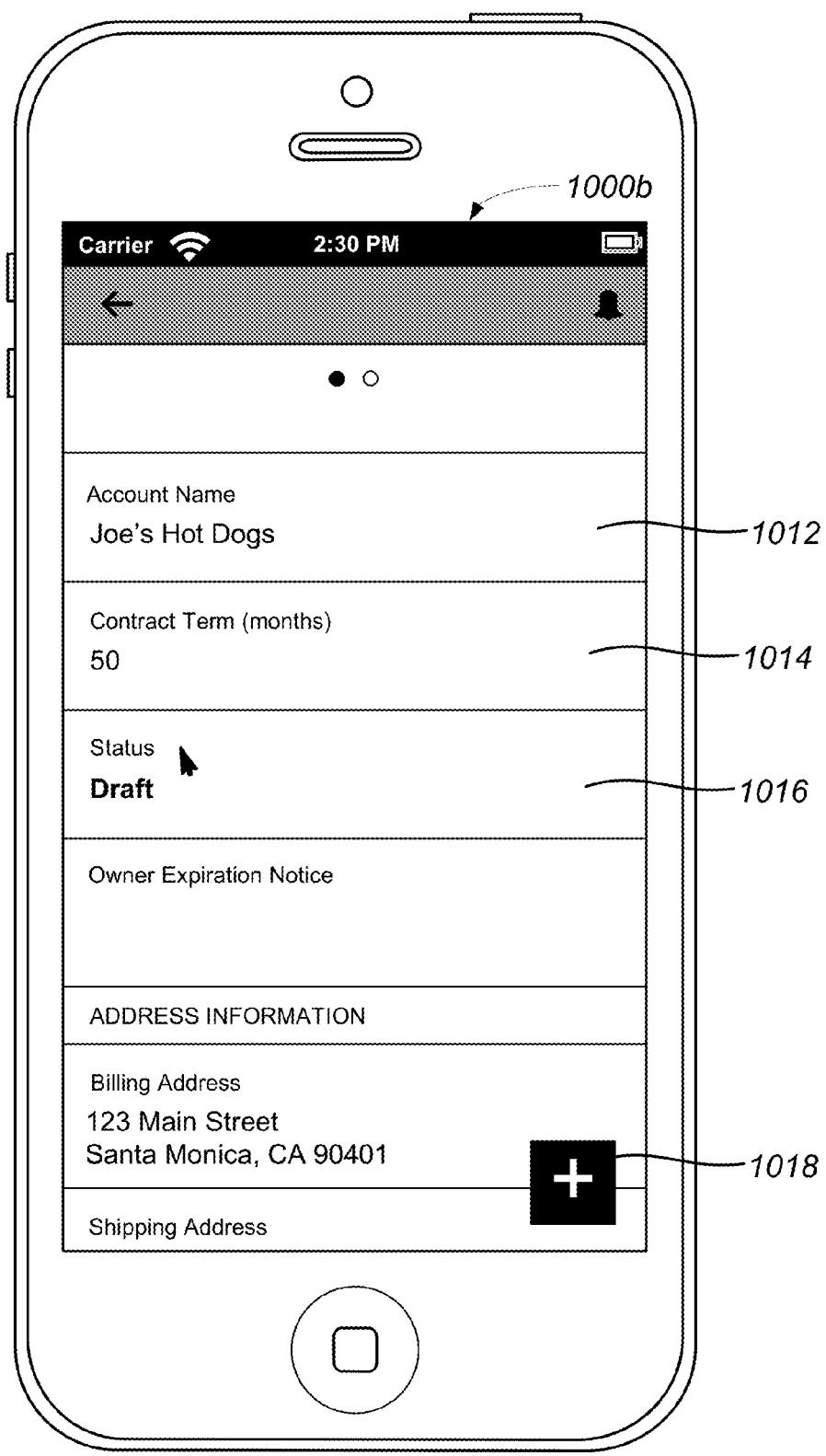
FIG. 10B shows an example of a user interface on the mobile device including details of a selected contract, according to some implementations.

FIG. 10B shows an example of a user interface 1000b on the mobile device including details of a selected contract, according to some implementations. As illustrated in FIG. 10B, the selected contract may be associated with an account 1012 named "Joe's Hot Dogs." Information regarding the selected contract may be presented in the user interface 1000b, including the contract term 1014 and the contract status 1016. Here, the contract status 1016 is listed as "Draft." Information regarding the account 1012 may also be provided, such as the address information and other information associated with the account 1012. The user interface 1000b may further include a selectable icon 1018 (e.g., plus sign) to access actions for interacting with the selected contract. The interaction can update the contract record that is associated with the account record in a hierarchical relationship, where the account record is a parent record and the contract record is a child record.

Figure 10C:
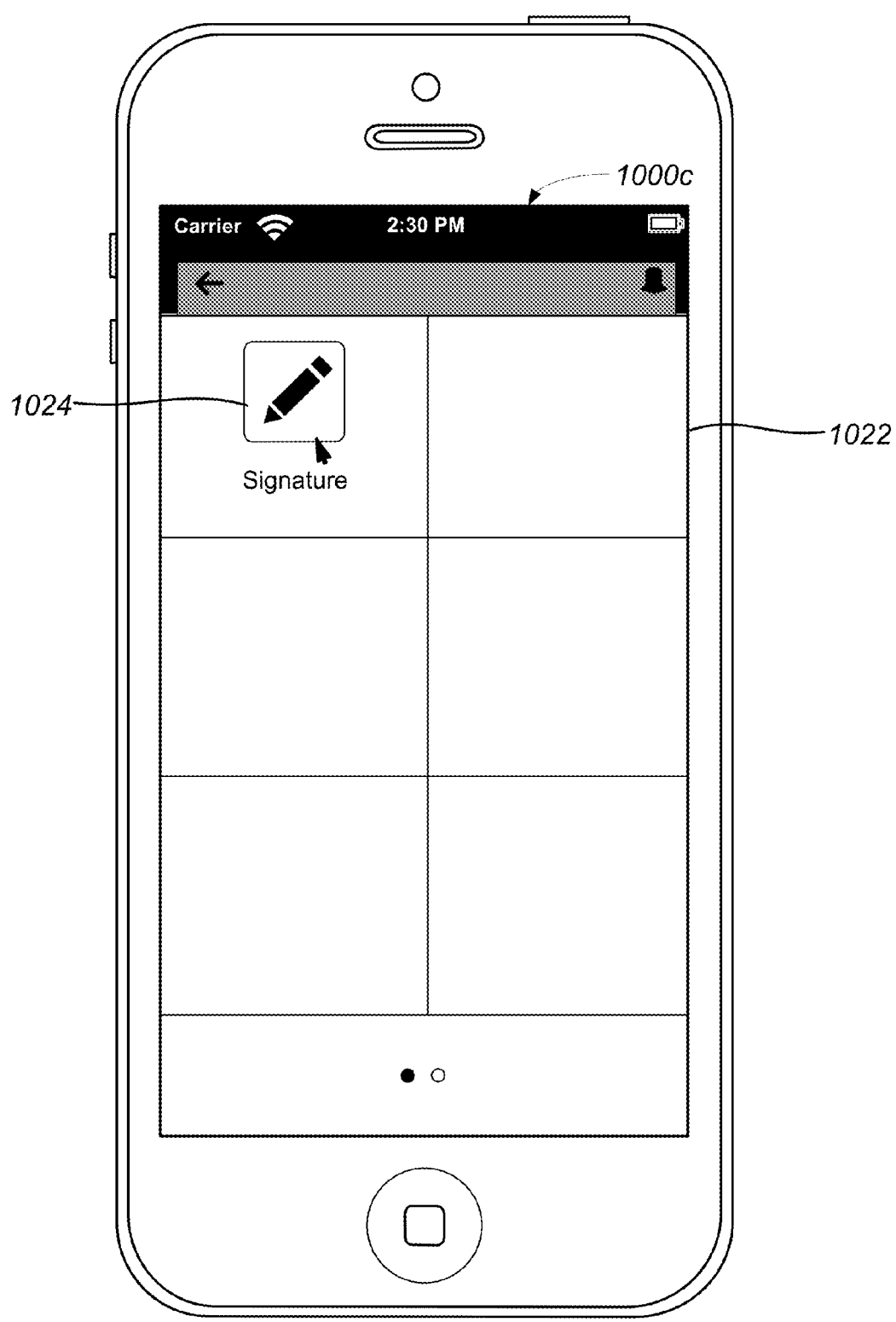
FIG. 10C shows an example of a user interface on the mobile device including an actions menu with an action for entering a third-party signature, according to some implementations.

The selection of the selectable icon 1018 can cause a modal or other interface to be displayed in the user interface 1000b. FIG. 10C shows an example of a user interface 1000c on the mobile device including an actions menu 1022 with an action 1024 for entering a third-party signature, according to some implementations. The action 1024 may be a selectable link, button, or icon arranged in an array of tiles in the actions menu 1022. The user may return to a previous page or interface by selecting a cancel or back button.

What selectable links 1024 are displayed in the actions menu 1022 can depend on the context in which the user was navigating. This means that whether the selectable link 1024 is displayed in the actions menu 1022 or not can depend on whether the selectable icon in FIG. 10B was selected from a feed, a user's profile, a feed comment, a detailed information page, etc. In FIG. 10C, the selectable link 1024 is an object-specific action that is a result of being accessed from a detailed information page corresponding to the selected contract record. Other actions not suitable for interacting with the contract record may be filtered out. The object-specific actions may perform an action on a database record to automatically associate with a parent database record. In addition or in the alternative, what selectable links 1024 are displayed in the actions menu 1022 can depend on a customization of the actions menu 1022. For example, what selectable links 1024 are displayed in the actions menu 1022 can depend on whether a user such as an administrator chose to make such selectable links 1024 available in the actions menu 1022.

In some implementations, what actions are provided in the user interface can depend on one or more attributes of the database record. In some implementations, the database record is a CRM object, the CRM object being one of: a lead, a case, an account, an opportunity, a task, a contact, a campaign, a contract, an event, a custom object, and a Visualforce page. One or more attributes of the database record can include but is not limited to a record identification (ID), a record type, a record relationship, metadata stored in association with the database record, and a context associated with the database record. As illustrated in FIG. 10C, a selectable link 1024 for creating a signature is displayed in the actions menu 1022, where the actions menu 1022 is accessed from a contract record. In some implementations, a server API can determine the selectable link 1024 for creating a signature to be displayed in the actions menu 1022 based on the attribute of the database record (e.g., record type being a contract). In some implementations, the selectable link 1024 for creating a signature can be displayed in the actions menu 1022 according to a customization of a user.

Some actions may be customized by users. In some implementations, users can select what type of action to create, including create actions, "log-a-call" actions, and update actions. Create actions allow users to create records, log-a-call actions permit users to record details of phone calls or other interactions, and update actions permit users to make changes to a record. In some implementations, the user can define what data fields are included in such actions according to a desired layout and according to any desired validation rules. The action can cause certain data fields to be displayed in the user interface, where the data fields may be formatted for receiving information according to the formats of the database system. For example, the formats of the database system may organize the database records in database tables, where data fields of a database record may correspond to columns in a database table.

At block 908 of FIG. 9, a first user input from a first user is identified via the user interface selecting one of the selectable links to request an action to be performed on the database record. The requested action is identified for requesting third-party information from a second user. The second user is different from the first user. The first user may be an authorized user with permission to access data in the database system of the on-demand database service. The accessed data can include database record. Thus, the first user may be an authorized user for interacting with the database record. In some implementations, the first user may be an owner of the mobile device. In some implementations, the first user may be associated with authorized login credentials for logging into an application associated with the on-demand database service. In some implementations, the second user may not be authorized to access data in the database system of the on-demand database service. In other words, the authorized login credentials for accessing the data in the database system do not correspond to the second user.

The selectable link can be one of a button, icon, image, or other selectable item on the user interface. On a mobile device, for example, a user can select one of the selectable links by tapping or pressing on a display to request the action to be performed. The user input selection can cause the action to be initiated via the API and the method call associated with the action. In some implementations, the user input selection can launch an action for interacting with the database record, such as creating or updating the database record to associate with a parent record.

The action to be performed on the database record may be identified for requesting third-party information from a second user. Third-party information can represent information from any party (i.e., the second user) other than the first user, where the first user is associated with the mobile device. One or more attributes may indicate that the action requires entry of third-party information from a second user. In some implementations, data fields in the database record may be flagged or otherwise identified for receiving third-party information. In some implementations, a user such as an administrator or developer may define that the action is associated with receiving third-party information. In one example, the third-party information can include a signature, such as a signature to confirm a transaction. In another example, the third-party information can include data collection, such as entry of personal data for completion of a form.

In some implementations, the selectable link can be associated with an action for obtaining third-party information to advance a workflow. Also, third-party applications can be integrated with actions in the on-demand database service. In some implementations, the selectable link can be associated with launching an application, such as a document signing application like DocuSign or Adobe. A plugin for providing a signature, such as in FIG. 10C, can be linked or otherwise associated with the document signing application. In some instances, an agreement can be included as part of the plugin so that a user may read what they are signing. The document signing application can then store a signature with the record.

In FIG. 10C, the selectable link 1024 for creating a signature can be identified for requesting third-party information. Thus, attributes associated with the signature action, such as an attribute defined by a developer, can identify that the signature is to be received from a third-party. Therefore, once the selectable link 1024 is selected, a user in possession of the mobile device may pass the mobile device to another user to obtain a signature.

Returning to FIG. 9, at block 912, a second user input is identified via the user interface to provide the third-party information. In some implementations, the second user input is associated with the second user. The second user input may correspond to various kinds of input actions. In one example, the input action can include keystrokes to enter characters. In another example, the input action can include a voice-activated command. In another example, the input action can include a touch-based action, such as a pressing action, a sliding action, a drag action, or a flick action on a touch-sensitive screen. These actions can be performed with reference to one or more fingers, a stylus, or other object.

The second user input can provide third-party information to be uploaded to the database system. In some implementations, the third-party information may be uploaded as an attachment to the database record. In some implementations, the third-party information may provide data to data fields of the database record. In some implementations, second user input may be subject to validation rules or other restrictions. For example, geo-fencing may restrict where a signature or other information may be collected.

By way of an example, a prospective patient may visit a dentist's office and complete a form regarding her personal information, such as her contact information, insurance information, medical history, etc. A receptionist at the dentist's office may hand the patient a mobile device displaying data fields for completion of the form. The patient may enter her contact information, insurance information, medical history, and other information into the data fields. Once the patient enters the information, a database record can be created for the patient and entered into a database system.

In another example, a delivery service agent may deliver a package to a home or office of a customer. The delivery service agent may choose a selectable link on her mobile device to obtain a signature to associate with the delivery record. The delivery service agent may hand off her mobile device to the customer for her signature to confirm receipt of the delivery. The display of the mobile device may include a user interface configured for receiving a signature. The customer can provide her signature. A signature can be rendered on the user interface using techniques for generating a smooth signature. For example, a smooth signature can be generated using cubic spline interpolation and velocity-based stroke width variance.

Figure 10D:
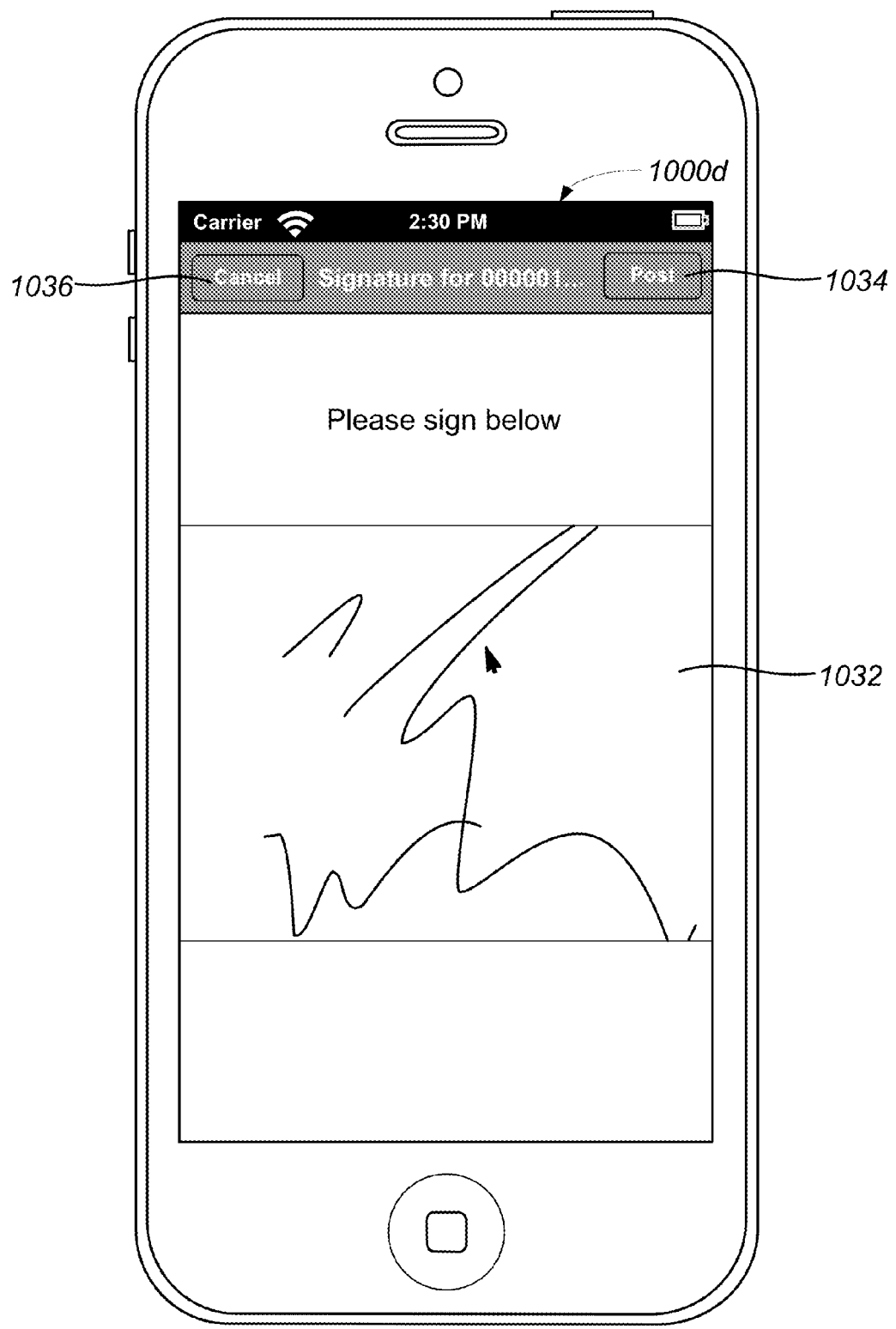
FIG. 10D shows an example of a user interface on the mobile device for entering a third-party signature, according to some implementations.

FIG. 10D shows an example of a user interface 1000d on the mobile device for entering a third-party signature 1032, according to some implementations. The user interface 1000d can include a space for entering the third-party signature 1032. Using touch-based sensing, the mobile device can receive the stroke(s) from a user and generate a signature that mimics the stroke(s) of the user. The touch points received from the user can be interpolated using a cubic spline interpolation, and the signature can be rendered using a variable stroke width technique. This means that the touch points provided from the user can be a smooth curve and that the width of the curve can vary according to the velocity of the user's stroke. As a result, a more natural curve can be rendered in the user interface 1000d that more accurately mimics the user's signature. The user may proceed to the next screen by selecting Post 1034 or may return to a previous screen by selecting Cancel 1036. The Post 1034 allows the third-party signature 1032 to be entered with the selected contract.

At block 916 of FIG. 9, the requested action can be caused to be performed on the database record using the third-party information. In some implementations, the requested action can be performed and the database record can be updated or created in accordance with the requested action before activation of a security mechanism. In some implementations, the requested action can be performed and the database record can be updated or created after activation and traversal of a security mechanism. The performance of the requested action can create a database record or update a database record for storing in the database system of the on-demand database service. For example, updating the database record can advance a workflow associated with the database record. In some implementations, a child database record can be created or updated to associate with a parent database record through performance of the requested action. The third-party information may be stored with the database record in the database system. In some implementations, the third-party information may be associated with one or more data fields of the record. In some instances, each database record can include metadata, where the metadata can describe the data fields associated with the database record. In some implementations, a feed item may be published in a feed of a parent database record, where the feed item can indicate performance of the requested action on the database record.

At block 920 of FIG. 9, a security mechanism is caused to be activated, where the security mechanism disables access to data stored in the database system of the on-demand database service. The data stored in the database system may be associated with the first user. Such data can include data that the first user has permission to access. In some implementations, the security mechanism can require input of some kind of passcode or biometric input. The security mechanism may be displayed on the display of the mobile device following the second user input. In some implementations, the security mechanism may cause the mobile device to be locked so that the mobile device cannot be used until the security mechanism is bypassed. For example, the security mechanism may further disable access to an operating system of the mobile device. In some implementations, the security mechanism may further disable access to the user interface and to data stored on the mobile device.

Hence, the security mechanism may disable: (1) the entire mobile device, (2) only the application associated with the on-demand database service for performing the action on the database record, or (3) the application and other additional functions/programs on the mobile device. The extent to which access to data may be restricted on the mobile device can depend on the operating system of the mobile device. For example, mobile devices using Android may implement a security mechanism that locks the entire mobile device, whereas mobile devices using iOS may implement a security mechanism that locks only the application associated with the on-demand database service.

Providing the security mechanism before performing the action on the database record can increase data security with respect to data accessible from the mobile device. There can be any number of ways that an unauthorized user can attempt to access the first user's data on the application associated with the on-demand database service or data stored locally on the mobile device. If the unauthorized user attempts to gain access to any such data, the security mechanism may be activated to restrict such access. For example, the security mechanism may be activated at any point after the mobile device is handed to the second user. In some implementations, a triggering input can be identified. The triggering input can cause the security mechanism to be activated. The triggering input can include a selection indicating one of the following: canceling the third-party information, posting the third-party information, and exiting an application associated with the on-demand database service. In other words, if the second user attempts to proceed to the next screen (e.g., post), return to the previous screen (e.g., cancel), or background the application, the security mechanism can be activated to prevent unauthorized access to data. Other triggering inputs may also cause the activation of the security mechanism, such as a timeout operation.

When a user triggers the security mechanism, the state of the application associated with the on-demand database service may be stored. That way, the third-party information and other information for performing the requested action may be stored locally or remotely. When the security mechanism is traversed, the mobile device may return to the stored state of the application. In some implementations, for example, the state of the application of may be stored in a SQLite database. The state of the application, including the third-party information, may be retrieved following traversal of the security mechanism.

Figure 10E:
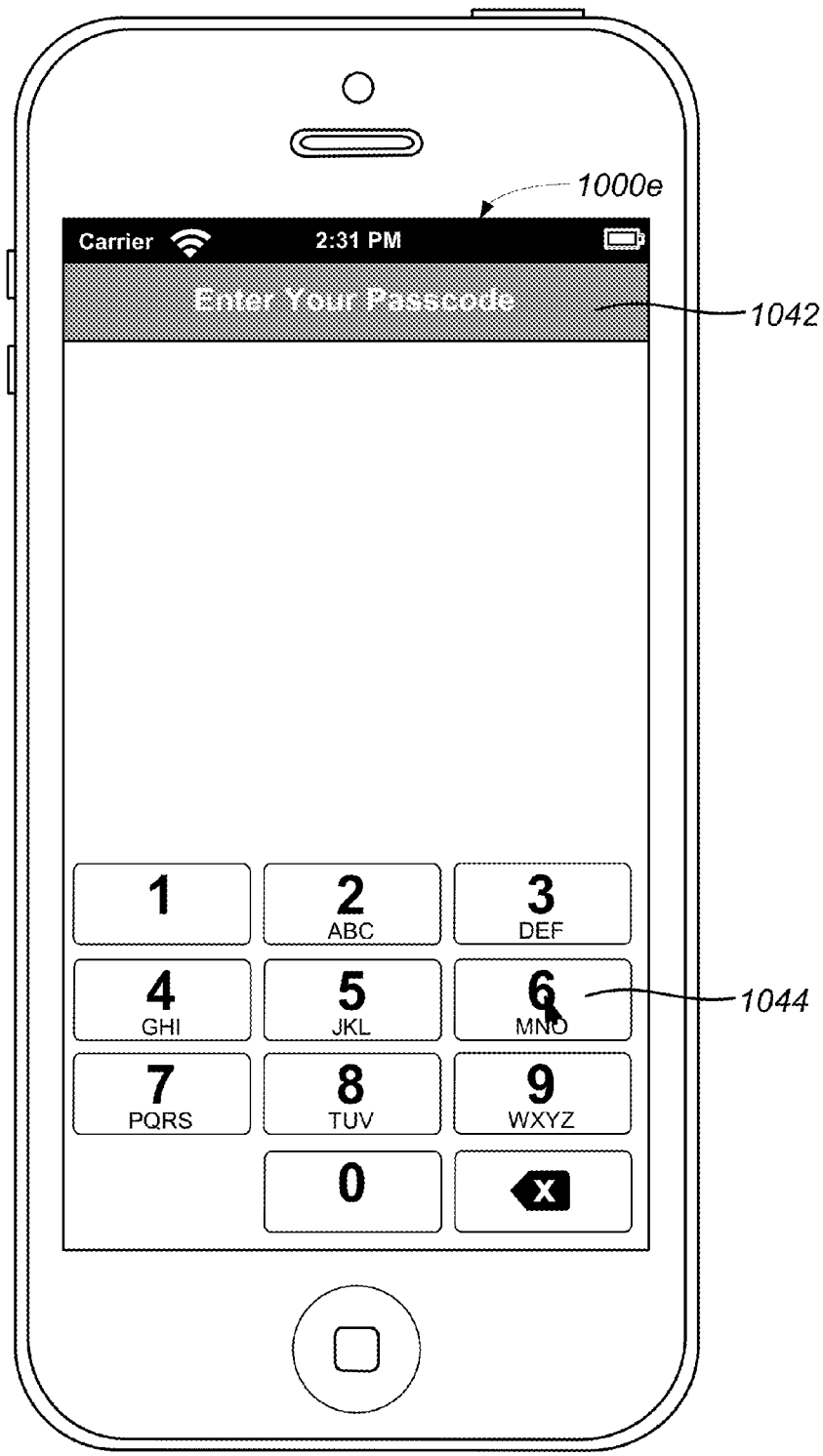
FIG. 10E shows an example of a user interface on the mobile device including a passcode security mechanism, according to some implementations.

FIG. 10E shows an example of a user interface 1000e on the mobile device including a passcode security mechanism 1044, according to some implementations. The user interface 1000e can include a space for receiving an input, such as a keypad 1042. The user interface 1000e can also include a space for displaying the received input. The passcode security mechanism 1044 allows the user to enter a numerical-based passcode from the keypad 1042. The passcode security mechanism 1044 may be activated following entry of the third-party signature 1032 in FIG. 1 OD.

Returning to FIG. 9, at block 924, a third user input is identified. The third user input may be identified for traversing the security mechanism. In some implementations, the third user input may provide one of an alpha-numeric password, a graphical password, a motion-based password, and a biometric input. A graphical password can require a user to draw a specific pattern. A motion-based password can require detection of a particular motion by the mobile device. Examples of biometric inputs can include a fingerprint scan, voice recognition, face recognition, gait recognition, heartbeat detection, and an iris scan, among others.

At block 928 of FIG. 9, the third user input is determined to satisfy an attribute of the security mechanism for traversing the security mechanism. In some implementations, the attribute of the security mechanism can be stored locally on the mobile device. In some implementations, the attribute of the security mechanism can be stored remotely, such as in a database system of an on-demand database service. The attribute of the security mechanism can be a user-defined passcode or biometric identification for authenticating the user to the mobile device. When the third user input matches the user-defined passcode or biometric identification, then the user is authenticated to the mobile device and the security mechanism is traversed. After the security mechanism is traversed, the mobile device can return to the stored state of the application. In some implementations, if the database record has not been updated or created according to the requested action already, then the database record can be updated or created after the security mechanism is traversed.

Figure 10F:
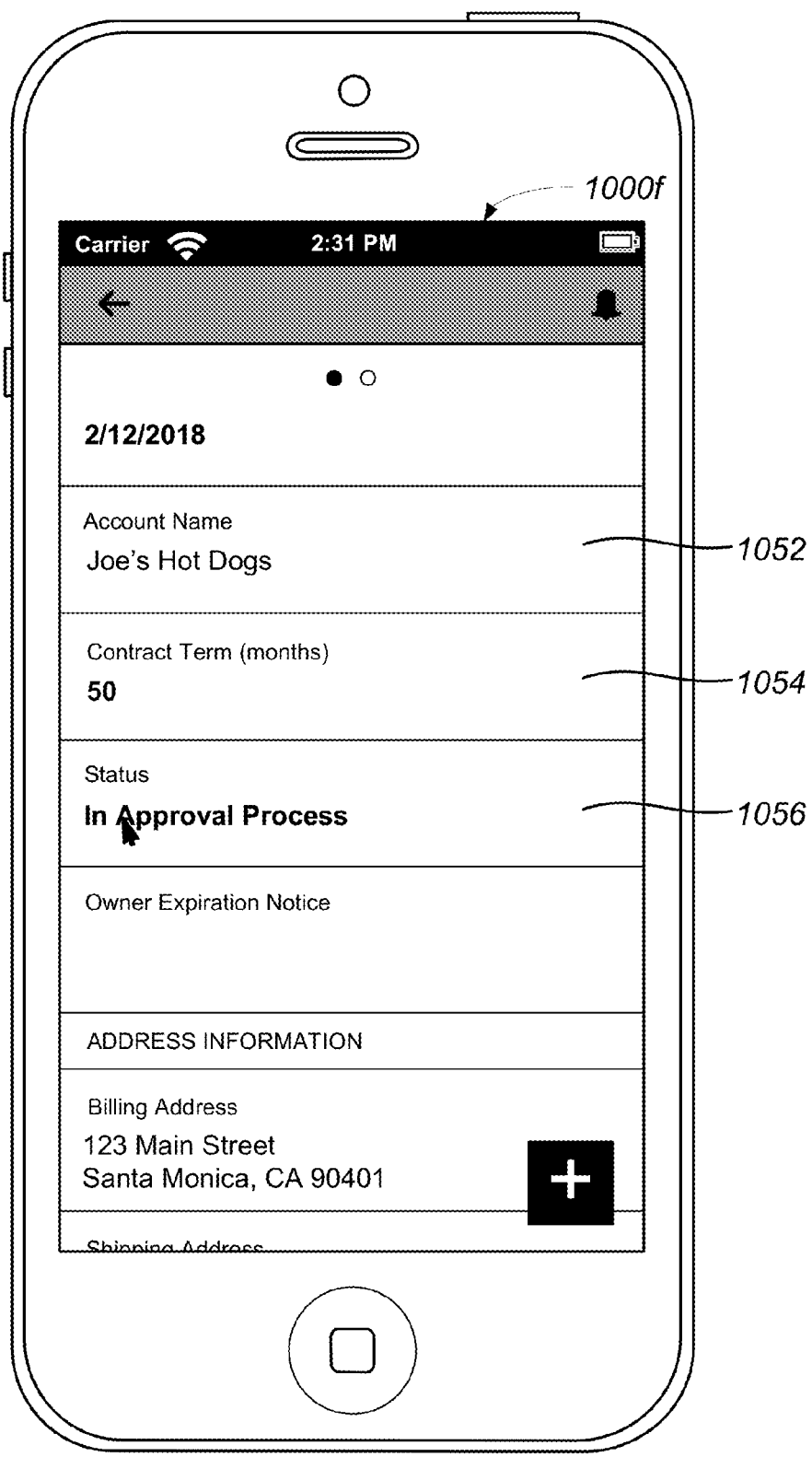
FIG. 10F shows an example of a user interface on the mobile device including updated details of the selected contract, according to some implementations.

FIG. 10F shows an example of a user interface 1000f on the mobile device including updated details of the selected contract, according to some implementations. The details of the selected contract can include an account name 1052, a contract term 1054, and a contract status 1056. Comparing the contract status 1016 in FIG. 10B and the contract status 1056 in FIG. 10F, the contract status 1056 is updated from "Draft" to "In Approval Process." Thus, after receiving the third-party signature 1032 in FIG. 10D, the selected contract record may be updated. Here, the update includes changing the status of selected contract record.

Figure 10G:
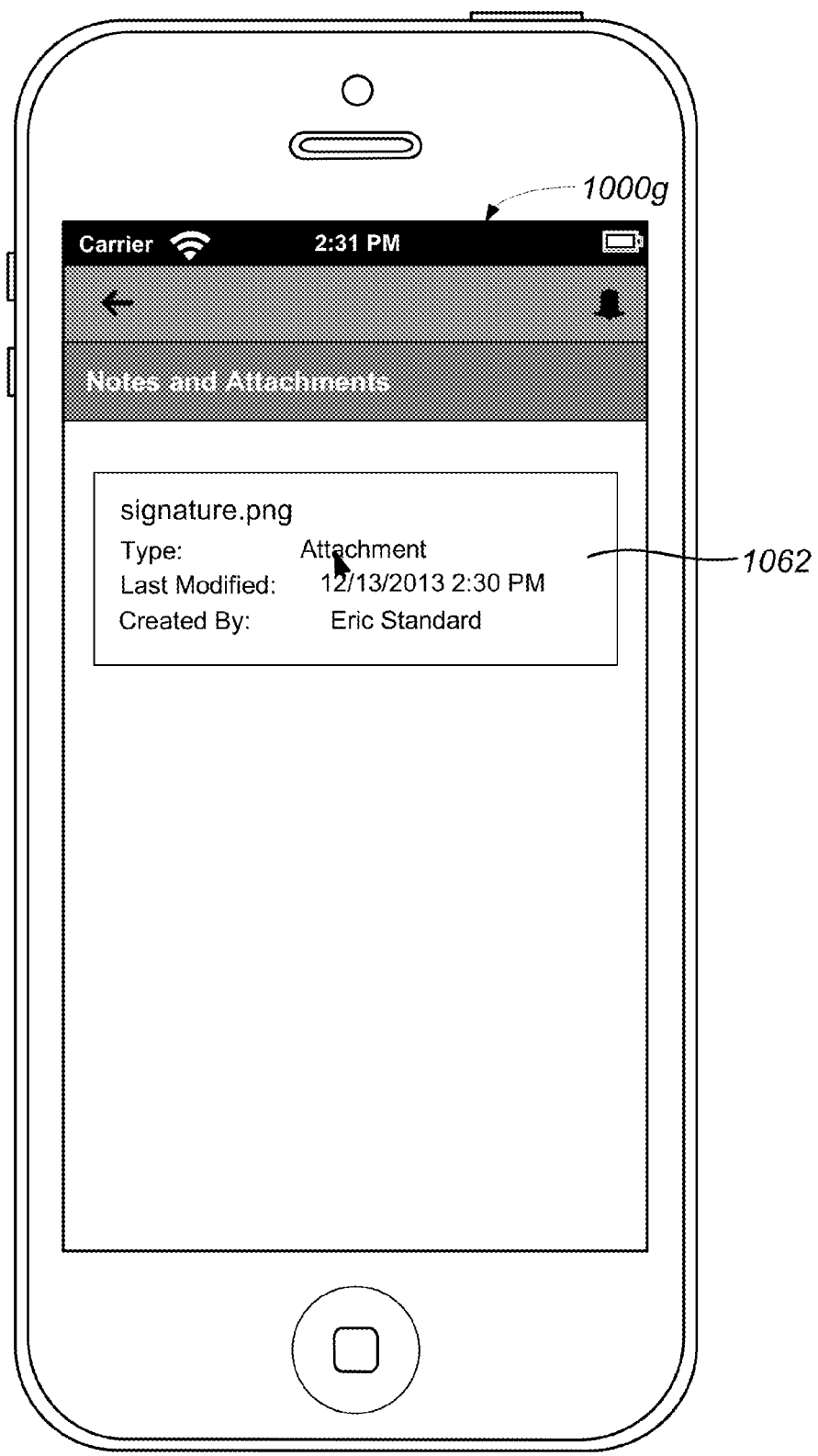
FIG. 10G shows an example of a user interface on the mobile device including an attachment of the entered third-party signature, according to some implementations.

FIG. 10G shows an example of a user interface 1000g on the mobile device including an attachment 1062 of the entered third-party signature, according to some implementations. The third-party signature 1032 in FIG. 10D may be saved with the selected contract record and saved as an image file in the attachment 1062. Metadata with the attachment 1062 may include a type of file, a timestamp of the last modification, and an author.

Additional information can be provided with the third-party information in the process of performing the requested action on the database record. In some implementations, such additional information may supplement the third-party information to validate the third-party information. In some implementations, one or more of a geolocation, a timestamp, and a photograph may be stored with the third-party information in the database system of the on-demand database service. To illustrate, a geolocation can be used to verify where the receipt of the third-party information took place, and a photograph can be used to verify the identity of the second user providing the third-party information.

Returning to earlier examples, a prospective patient filling out a form on a mobile device at a dentist's office may be prevented from accessing data, including data stored locally on the mobile device and data stored remotely in a database system and accessible through an application associated with an on-demand database service. When the prospective patient submits her information to update or create the patient's contact record, or otherwise tries to exit the screen, a passcode security mechanism may appear. When the receptionist or some other authorized user of the mobile device enters the correct passcode, the mobile device may be unlocked so that the user can access the application associated with the on-demand database service.

When a delivery service agent seeks to confirm delivery of a package to a customer by obtaining a signature of the customer, the customer may be prevented from accessing data on the mobile device. The customer may provide her signature to update a delivery record with the signature, and a passcode security mechanism may appear after entry of the signature. In some instances, the signature can be provided with a geolocation to verify the correct location of the delivery. When the delivery service agent enters the correct passcode, the mobile device is unlocked so that the delivery service agent can access data on the mobile device.

Figure 11:
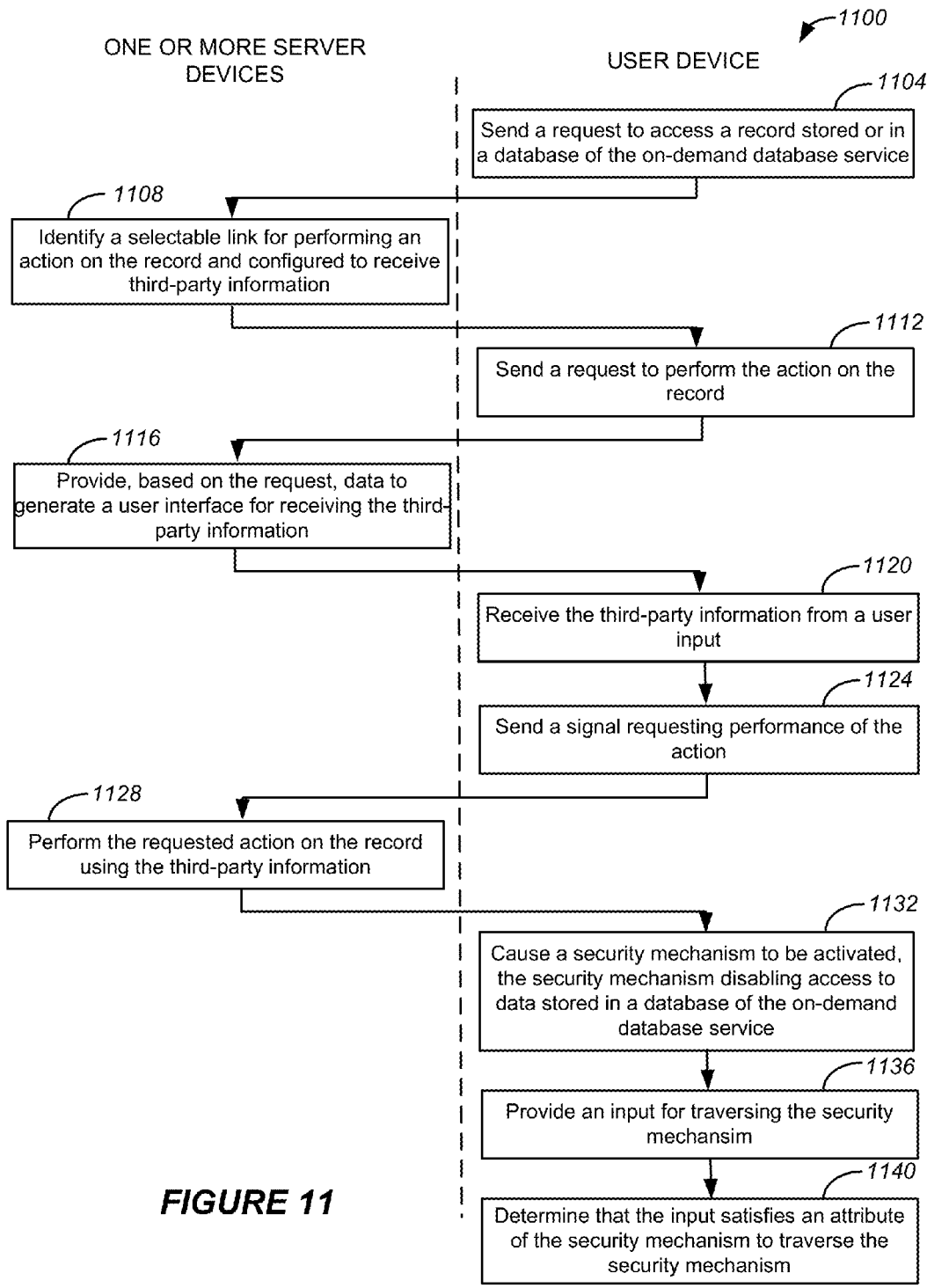
FIG. 11 shows an example of a system timing diagram of operations performed between a user device and one or more servers for activating a security mechanism, performed in accordance with some implementations.

FIG. 11 shows an example of a system timing diagram of operations performed between a user device and one or more servers for activating a security mechanism, performed in accordance with some implementations. The system timing diagram illustrates a method 1100 for providing a security mechanism before performing an action on a record in an on-demand database service, including actions described earlier herein. The operations in the method 1100 may be performed in different orders and/or with different, fewer, or additional operations. The operations in the method 1100 are described with reference to FIGS. 1A-1B and 2A-2B.

In FIG. 11, at block 1104, a user device sends a request to access a record stored or configured to be stored in a database of the on-demand database service. The user device can be, for example, a mobile display device. The database can be an online social networking database system and the record can be a database record. The request can include a signal providing a unique record ID for identifying the record in the on-demand database service. The user device can communicate with one or more server devices in a cloud environment. As shown in FIG. 1A, for example, the user system 12 can send the request via network 14 to the network interface 20 of a database system 16. The request may be sent in response to a user input on an application associated with the on-demand database service. Details regarding the database record, including metadata, may be provided in a user interface for display on the user device.

One or more server devices can process the request from the user device. At block 1108 of FIG. 11, in response to receiving the request from the user device, a selectable link is identified for performing an action on the record and configured to receive third-party information. One or more attributes of the action may indicate that the action is configured to receive third-party information. For example, the action may be programmed to receive third-party information, such as a third-party signature. The action can cause the one or more server devices to invoke a unique method call. Upon identifying the record based on the record ID, selectable actions or selectable links can be identified at the one or more server devices in the on-demand database service. The one or more server devices can include server devices in pod 244 or in communication with pod 244 of FIG. 2B. Such server devices can include but is not limited to content batch servers 264, content search servers 268, query servers 282, file force servers 286, ACS servers 280, batch servers 284, app servers 288, database instances 290, indexers 294, and load balancers 228. The selectable link can be provided in the user interface of the display of the user device.

Once the selectable link is provided in the user interface, a user input can select the selectable link. At block 1112, a request to perform the action on the record is sent. A request can be sent to the one or more server devices to perform an action on the record and associated with the selectable link. Such a request can be sent via network 14 to the network interface 20 of the database system 16 in FIG. 1A. In some implementations, the request can be sent responsive to the user device receiving a user input selecting the selectable link. Hence, the request can be sent in response to a user interacting with the application associated with the on-demand database service.

At block 1116, data to generate a user interface for receiving third-party information is provided based on the request. In some implementations, the third-party information may be associated with information from a user not associated with the user device or not associated with the database of the on-demand database service. The one or more server devices can send data to the user device to provide a user interface including a space configured for receiving third-party information. For example, the user interface can include data fields formatted for receiving third-party information according to formats of the database. The data fields in the user interface may be associated with data fields of the record. In some implementations, the user interface can include a space for receiving a signature. The one or more server devices can send the data via network 14 to the user device 12 as shown in FIG. 1A.

When the user interface is generated, the user device is capable of receiving third-party information. At block 1120, the third-party information is received from a user input. The user input may be associated with a user not associated with the user device or not associated with the database of the on-demand database service. The user may not be authorized to access information in the database of the on-demand database service. Such access may be limited to the owner of the user device or to another user logged into the application associated with the on-demand database service. However, the user is permitted to enter the third-party information at the user interface. Receipt of the third-party information can occur from any suitable input action. Input actions can include keystrokes, a voice-activated command, and a touch-based action such as a pressing action, a sliding action, a drag action, or a flick action.

After the third-party information is received at the user device, a signal can be sent to perform the requested action with the third-party information. Hence, at block 1124, a signal is sent requesting performance of the action on the record. The signal requesting performance of the action can be sent to the one or more server devices to perform the action on the record. Such a request can be sent via network 14 to the network interface 20 of the database system 16 in FIG. 1A. The signal can be sent from the user device. However, the signal requesting performance of the action can also trigger a security mechanism to be activated on the user device.

At block 1128, the requested action is performed on the record using the third-party information. The one or more server devices can receive the signal from the user device to perform the requested action. The database that stores or is configured to store the record can be updated based on the third-party information. Examples of actions that can be performed on the database record can include creating the record and updating the record. In some implementations, updating the record can include advancing a workflow associated with the record. In some implementations, the one or more server devices can provide a feed item in a feed associated with the record, the feed item indicating performance of the action on the record with the third-party information. In some implementations, the third-party information can be provided in one or more data fields associated with the record.

At block 1132, a security mechanism is caused to be activated, where the security mechanism disables access to data stored in a database of the on-demand database service. The security mechanism can lock the user device or at least the application associated with the on-demand database service. The security mechanism can require a passcode or other input to authenticate the user to the user device. In some implementations, the security mechanism can restrict access to data stored on the user device. In some implementations, the security mechanism can restrict access to the user interface. In some implementations, the security mechanism can restrict access to the operating system of the user device. What restrictions the security mechanism can place on the user device can depend on the operating system of the user device and/or the user preferences of the user device. Thus, the security mechanism verifies that the authorized user is in possession of the user device.

At block 1136, an input for traversing the security mechanism is provided. The input can be one of an alpha-numeric password, a graphical password, a motion-based password, and a biometric input.

At block 1140, the input is determined to satisfy an attribute of the security mechanism to traverse the security mechanism. In some implementations, the attribute of the security mechanism can be a user-defined passcode. In some implementations, the attribute of the security mechanism can be a biometric identification, such as a fingerprint. The attribute of the security mechanism can be stored locally on the user device, or remotely on a database of the on-demand database service. When the input matches the attribute of the security mechanism, the security mechanism is traversed. As a result, the user device or at least the application associated with the on-demand database service is no longer locked.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A mobile device comprising:
a display;
one or more storage media; and
one or more processors capable of executing one or more instructions stored on the one or more storage media, the instructions configured to cause:
providing, on the display, a user interface presenting a plurality of selectable links associated with a plurality of actions capable of being performed on one or more database records stored in a database system,
processing a first user input received at the device from a first user identifiable as an authorized user of the device, the first user input selecting one of the selectable links,
identifying the selected link as being associated with a first action requesting information from a second user not identifiable as an authorized user of the device,
processing a second user input received at the device, the second user input providing the requested information,
causing the first action to be performed on a database record using the requested information,
identifying an occurrence of a security event associated with the second user, and
causing, responsive to identifying the occurrence of the security event associated with the second user, a security mechanism to be activated, the security mechanism disabling access via the device to at least the database system.

2. The mobile device of claim 1, the one or more instructions configured to further cause:
identifying a third user input, wherein the third user input provides one of an alpha-numeric password, a graphical password, a motion-based password, and a biometric input.

3. The mobile device of claim 1, wherein the security mechanism further disables access to the user interface and to data stored on the mobile device.

4. The mobile device of claim 1, the one or more instructions configured to further cause:
identifying a triggering input to cause the security mechanism to be activated, the triggering input including a selection indicating one of: canceling the requested information, posting the requested information, and exiting from an application associated with the database system.

5. The mobile device of claim 1, the one or more instructions configured to further cause:
causing the database record to be updated based on the performance using the requested information, wherein the update advances a workflow in the database system.

6. The mobile device of claim 1, wherein the requested information is a signature.

7. The mobile device of claim 1, the one or more instructions configured to further cause:
storing one or more of a geolocation, a timestamp, and a photograph with the requested information in a database system of the on-demand database service.

8. Apparatus for providing a security mechanism on a mobile device, the apparatus comprising:
one or more processors capable of executing one or more instructions configured to cause:
identifying a plurality of selectable actions capable of being performed on one or more database records stored in a database system, one or more of the plurality of selectable actions being provided to a user interface of a mobile device,
receiving, based on a first user input from a first user selecting one of the selectable actions from the mobile device, a request to receive information from a second user not identifiable as an authorized user of the mobile device,
receiving, based on a second user input received at the mobile device, the requested information,
causing the first action to be performed on a database record using the requested information, identifying an occurrence of a security event associated with the second user, and activating, responsive to identifying the occurrence of the security event associated with the second user, a security mechanism on the mobile device, the security mechanism disabling access via the device to at least the database system.

9. The apparatus of claim 8, wherein the requested input provides one of an alpha-numeric password, a graphical password, a motion-based password, and a biometric input.

10. The apparatus of claim 8, updating the database record based on the performance using the requested information, wherein the update advances a workflow in the database system.

11. The apparatus of claim 8, wherein the requested information is a signature.

12. A computer-implemented method for providing a security mechanism on a mobile device, the method comprising:

providing, on a display of a mobile device, a user interface presenting a plurality of selectable links associated with a plurality of actions capable of being performed on one or more database records stored in a database system, processing a first user input received at the device from a first user identifiable as an authorized user of the device, the first user input selecting one of the selectable links, identifying the selected link as being associated with a first action requesting information from a second user not identifiable as an authorized user of the device, processing a second user input received at the device, the second user input providing the requested information, causing the first action to be performed on a database record using the requested information, identifying an occurrence of a security event associated with the second user, and causing, responsive to identifying the occurrence of the security event associated with the second user, a security mechanism to be activated, the security mechanism disabling access via the device to at least the database system.

13. The method of claim 12, wherein the security mechanism further disables access to the user interface and to data stored on the mobile device.

14. The method of claim 12, further comprising:
causing the database record to be updated based on the performance using the requested information, wherein the update advances a workflow in the database system.

15. The method of claim 12, wherein the requested information is a signature.

16. A computer program product comprising a non-transitory computer-readable storage medium storing computer-readable program code to be executed by one or more processors when retrieved from the non-transitory computer-readable storage medium for providing a security mechanism, the program code comprising instructions configured to cause:

providing, on a display of a mobile device, a user interface presenting a plurality of selectable links associated with a plurality of actions capable of being performed on one or more database records stored in a database system, processing a first user input received at the device from a first user identifiable as an authorized user of the device, the first user input selecting one of the selectable links, identifying the selected link as being associated with a first action requesting information from a second user not identifiable as an authorized user of the device, processing a second user input received at the device, the second user input providing the requested information, causing the first action to be performed on a database record using the third-party information, identifying an occurrence of a security event associated with the second user, and causing, responsive to identifying the occurrence of the security event associated with the second user, a security mechanism to be activated, the security mechanism disabling access via the device to at least.

17. The computer program product of claim 16, wherein the security mechanism further disables access to the user interface and to data stored on the mobile device.

18. The computer program product of claim 16, the program code further including instructions to cause:
causing the database record to be updated based on the performance using the requested information, wherein the update advances a workflow in the database system.

* * * * *